(12) United States Patent
Cerra et al.

(10) Patent No.: US 9,732,700 B2
(45) Date of Patent: *Aug. 15, 2017

(54) METHODS AND APPARATUS FOR PASSIVE THRUST VECTORING AND PLUME DEFLECTION

(71) Applicant: The Boeing Company, Chicago, IL (US)

(72) Inventors: David F. Cerra, Woodinville, WA (US); Robert H. Willie, Bothell, WA (US); Alvaro Prieto, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 295 days.

This patent is subject to a terminal disclaimer.

(21) Appl. No.: 14/496,526

(22) Filed: Sep. 25, 2014

(65) Prior Publication Data
US 2015/0361823 A1    Dec. 17, 2015

Related U.S. Application Data

(63) Continuation-in-part of application No. 14/062,673, filed on Oct. 24, 2013.

(51) Int. Cl.
*F02K 1/00* (2006.01)
*F02K 1/06* (2006.01)
(Continued)

(52) U.S. Cl.
CPC ............... *F02K 1/006* (2013.01); *B64C 7/02* (2013.01); *B64D 33/04* (2013.01); *F02K 1/002* (2013.01);
(Continued)

(58) Field of Classification Search
CPC . F02K 1/002; F02K 1/006; F02K 1/30; F02K 1/46; F02K 1/48; F02K 1/06; F02K 9/82; F05D 2250/73
See application file for complete search history.

(56) References Cited

U.S. PATENT DOCUMENTS 5,369,954 A    12/1994    Stuart
5,372,005 A *  12/1994    Lawler .................... F02C 3/165
                                              416/22
(Continued)

FOREIGN PATENT DOCUMENTS

EP    1340901    9/2003
EP    1703114    9/2006
EP    2093407    8/2009

OTHER PUBLICATIONS

European Patent Office, "Extended European Search Report," issued in connection with European Patent Application No. 14188041.9, issued on Jul. 7, 2015, 7 pages.
(Continued)

*Primary Examiner* — Andrew Nguyen
(74) *Attorney, Agent, or Firm* — Hanley, Flight & Zimmerman, LLC

(57) ABSTRACT

A flow vectoring turbofan engine employs a fixed geometry fan sleeve and core cowl forming a nozzle incorporating an asymmetric convergent/divergent (con-di) and/or curvature section which varies angularly from a midplane for reduced pressure in a first operating condition to induce flow turning and axially symmetric equal pressure in a second operating condition for substantially axial flow.

34 Claims, 18 Drawing Sheets

(51) Int. Cl.
*F02K 1/30* (2006.01)
*F02K 1/46* (2006.01)
*B64C 7/02* (2006.01)
*B64D 33/04* (2006.01)

(52) U.S. Cl.
CPC .............. *F02K 1/06* (2013.01); *F02K 1/30* (2013.01); *F02K 1/46* (2013.01); *F05D 2250/323* (2013.01); *F05D 2250/324* (2013.01); *F05D 2250/71* (2013.01); *F05D 2250/73* (2013.01); *F05D 2260/96* (2013.01); *Y02T 50/671* (2013.01)

(56) References Cited

U.S. PATENT DOCUMENTS

| | | | | |
|---|---|---|---|---|
| 6,021,637 A * | 2/2000 | Scavo | ............ | F02K 1/30 239/265.17 |
| 6,658,839 B2 * | 12/2003 | Hebert | ............ | B64D 33/06 181/213 |
| 7,735,601 B1 * | 6/2010 | Stieger | ............ | B64D 33/06 181/213 |
| 8,511,090 B2 | 8/2013 | Mengle | | |
| 2005/0138915 A1 | 6/2005 | Bardagi et al. | | |
| 2009/0259379 A1 * | 10/2009 | Hurwitz | ............ | F02K 1/002 701/100 |
| 2010/0032497 A1 | 2/2010 | Rose et al. | | |
| 2010/0043394 A1 * | 2/2010 | Pero | ............ | F01D 17/14 60/226.3 |
| 2015/0113946 A1 | 4/2015 | Willie et al. | | |

OTHER PUBLICATIONS

European Patent Office, "Extended European Search Report", issued in connection with European Patent Application No. 15184197.0, issued on Feb. 23, 2016, 7 pages.

* cited by examiner

METHODS AND APPARATUS FOR PASSIVE THRUST VECTORING AND PLUME DEFLECTION

RELATED APPLICATION

This application is a continuation-in-part of U.S. patent application Ser. No. 14/062,673, filed Oct. 24, 2013, which is hereby incorporated herein by reference in its entirety.

FIELD

Embodiments of the disclosure relate generally to propulsion systems and, more particularly, to methods and apparatus for passive thrust vectoring and plume deflection.

BACKGROUND

Achieving in-flight thrust optimization with simultaneous minimization of exhaust jet (or flap) interaction and low wing flap dynamic loading on an aircraft with a close coupled engine installation is a significant design challenge.

SUMMARY

An example flow vectoring turbofan engine disclosed herein includes a fixed geometry fan sleeve and core cowl forming a nozzle, the nozzle incorporating asymmetric convergence/divergence (con-di) and wall curvature varying angularly from a midplane, a first degree of the wall curvature being implemented during a first operating condition to reduce pressure, and a second degree of the wall curvature being implemented during a second operating condition to induce flow turning and axially symmetrically equal pressure.

An example jet propulsion device is disclosed herein. The example jet propulsion device disclosed herein has a flow vectoring duct for a bypass engine and includes a substantially annular exhaust duct surrounding a jet engine center body forming a pair of concentric opposing inner and outer walls; a throat region asymmetrically positioned in the outer wall of the exhaust duct forming a region of convergence, where the inner and outer walls converge, an amount of convergence varying longitudinally along the walls; and a region of divergence, where the inner and outer walls diverge, an amount of divergence varying longitudinally along the walls.

An example fixed geometry differential vectoring nozzle for a jet propulsion device is disclosed herein. The example nozzle disclosed herein includes a first wall portion having a first curvature and a first exit; a second wall portion having a second curvature and a second exit varying longitudinally with respect to the first curvature to induce lower pressure proximate the second wall portion relative to pressure proximate the first wall portion in a first operating condition and substantially equal pressure proximate the first and second wall portions in a second operating condition.

An example method for fan nozzle plume vectoring in a turbofan engine is disclosed herein. The example method includes providing a fan nozzle having an asymmetric convergence and divergence (con-di) section with greater con-di in a bottom portion of the fan nozzle relative to a top portion; operating the fan nozzle below a choke threshold to reduce pressure in the bottom portion of the fan nozzle having greater con-di for differentially inducing circumferential flow resulting in the fan nozzle flow being vectored toward the bottom portion; and operating the fan nozzle above the choke threshold for substantially uniform pressure across the con-di section to produce substantially axial flow.

An example method for vectoring exhaust gas air flow passing through a substantially annular exhaust bypass duct of a bypass jet engine is disclosed herein. The example method includes positioning a jet engine having a bypass duct beneath a wing such that unvectored jet exhaust flow from the bypass duct in a choked condition is proximate a trailing edge flap of the wing; and contouring a predefined portion of a bypass duct distal to the trailing edge flap to redirect and vector a portion of the air flow in the bypass duct in an unchoked condition away from the trailing edge flap to reduce an interaction between the jet exhaust and the trailing edge flap.

An example method for vectoring flow in a fixed geometry nozzle is disclosed herein. The example method includes configuring a nozzle with convergence and divergence and an exit position providing an asymmetrical sectional area ratio from a first portion of the nozzle to a second portion of the nozzle; operating the nozzle in a choked condition with an exit flow from the nozzle being substantially axial; and operating the nozzle in an unchoked condition for differential vectoring of the exit flow from the first portion of the nozzle toward the second portion.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1A:
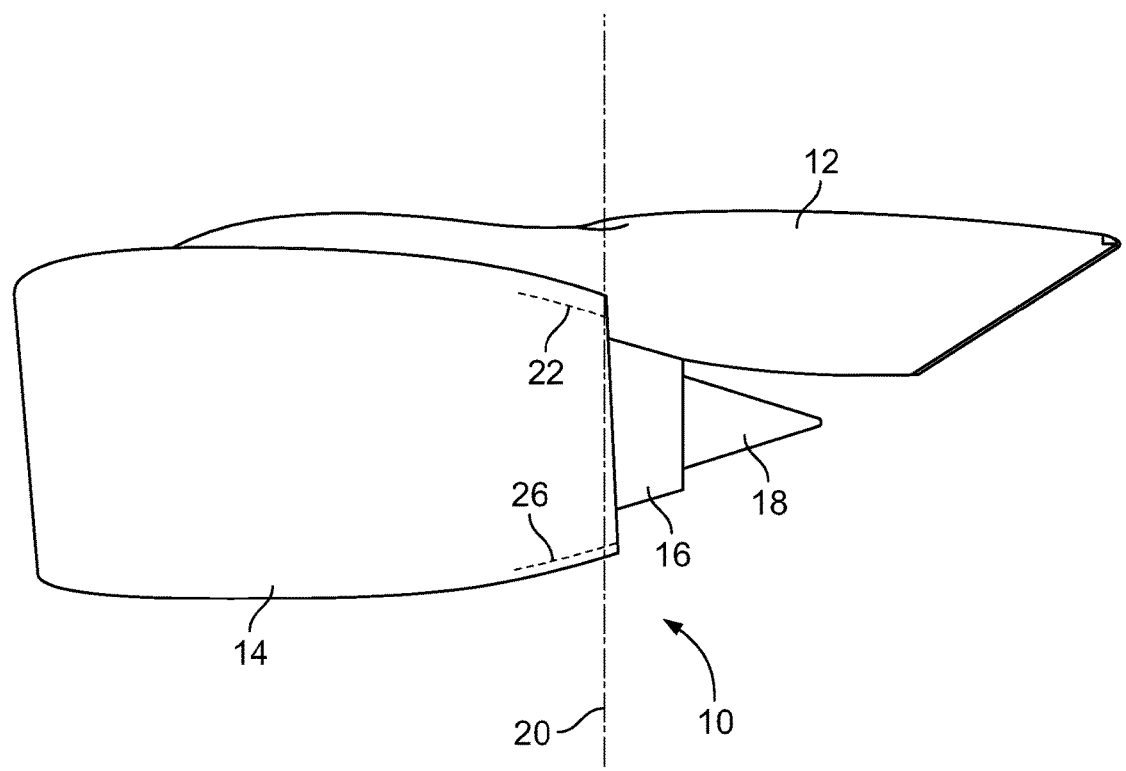
FIG. 1A is a side view of a turbofan engine nacelle employing a first embodiment.

Traditional fixed geometry approaches to achieving in-flight thrust optimization with simultaneous minimization of exhaust jet (or flap) interaction noise and low wing flap loading for fanjet engines have involved compromise where neither individual objective was fully achieved. An approach may be employed using variable geometry for thrust vectoring from the engine, but penalties may be incurred to propulsion system leakage and/or fuel burn, weight, complexity and/or failure modes, and maintenance, all of which burden the aircraft. Additionally, a variable geometry solution is costly to manufacture relative to a conventional design. No existing cost effective solutions are available for the problem without design compromises. Known designs point the nozzle flow in a single direction that is neither ideal for high speed cruise performance nor ideal for low speed community noise or wing flap structural weight. The result is non-optimum performance from both a fuel flow and noise standpoint for the aircraft. Recent studies have shown traditional design approaches can miss significant opportunities in reduced fuel burn and lower noise on close coupled engine and/or airframe installations.

It is therefore desirable to provide a fixed geometry thrust differential vectoring solution that simultaneously provides aircraft performance optimization, low wing component loads, and minimization of noise (e.g., flap noise and/or shock cell noise). It is further desirable to provide a fixed geometry fan nozzle to control exhaust plume direction differentially for high speed, high pressure ratio operation compared to low speed, low pressure ratio operation.

Embodiments disclosed herein demonstrate modification of nozzle profiles for jet propulsion devices including, for example, a turbofan or turbojet engine from a baseline symmetrical profile to a desired asymmetrical profile with selected curvature and sectional area ratio with clocked positioning. Such embodiments disclosed herein provide a pressure differential to vector an exhaust plume in a desired direction with unchoked flow through a nozzle while providing differentially vectored flow from the nozzle in a choked condition.

In some embodiments, turbofan engines with a fan sleeve and inner wall or core cowl as a centerbody create a fan nozzle with an asymmetric three dimensional differential curvature and/or convergent/divergent (con-di) area ratio section in a region of the fan nozzle just upstream of an exit. The geometry provided by embodiments disclosed herein includes two flow control regions. The nozzle geometry provided by embodiments disclosed herein results in a lower pressure portion near a bottom of the nozzle exit relative to a top with the nozzle operating in an unchoked condition with subsonic or transonic fully expanded flow conditions such as, for example, take-off and approach. The flow at the top of the nozzle is at relatively higher pressure traveling at a lower subsonic Mach number. This pressure differential induces circumferential momentum causing the nozzle flow to be vectored downward away from the wing and/or flaps. Additionally, in some embodiments disclosed herein, specifically shaped exhaust nozzle chevrons may be integrated with the fan nozzle. The chevrons locally induce vortical mixing in the top portion of the flow to reduce a velocity gradient across the plume, locally redistributing energy away from the wing and/or flaps region. The vectoring and plume energy re-distribution provided by embodiments disclosed herein lower jet flap noise at take-off and approach. At cruise, the operating nozzle pressure ratio is higher resulting in a choked flow at supersonic fully expanded flow conditions and the nozzle geometry acts uniformly on the flow at a nozzle throat, which may be located upstream of a nozzle exit. The uniformity of the pressure provided by embodiments disclosed herein results in flow exiting the nozzle nearly (e.g., within a threshold) axially, thereby improving and/or optimizing in-flight thrust. This flow direction difference, or differential vectoring, between lower and higher nozzle pressure ratios provided by embodiments disclosed herein enables the simultaneous improvement and/or optimization of performance, reduced flap dynamic loading, and lower noise.

Additionally, the nozzle geometries disclosed herein reduce noise caused by shock cells. At least a portion of shock cell noise radiates toward, for example, a cabin and/or fuselage of an aircraft, causing undesirable interior noise. As described in detail below, the axially asymmetric con-di example nozzle geometries disclosed herein reduces the strength of the shock cells and causes the shock cells to dissipate more rapidly. As the strength of the shock cells is reduced and the corresponding shock cell train dissipates more rapidly, less acoustic energy is radiated toward, for example, the cabin of the aircraft. Less acoustic energy radiating toward the cabin reduces unwanted interior noise. Further, as the level of interior noise is reduced by the example geometries disclosed herein, implementation of additional or alternative shock cell noise reduction equipment and/or techniques is mitigated or eliminated by examples disclosed herein. For example, the reduction in shock cell noise provided by examples disclosed herein enables avoidance, reduction in number, or complete removal of shock cell chevrons from the aircraft. Although shock cell chevrons reduce shock cell noise, shock cell chevrons generate other high frequency noise, are subject to maintenance requirements, and may have high manufacturing costs due to tight tolerance requirements. Additionally or alternatively, the reduction in shock cell noise provided by examples disclosed herein enables avoidance, reduction in number, or complete removal of insulation blankets from the aircraft, thereby avoiding the undesirable weight of the insulation blankets. Accordingly, the nozzle geometries (e.g., axial asymmetry of the con-di) disclosed herein reduce shock cell noise in a more efficient, more cost effective, and less complex manner than known systems.

Alternative embodiments applicable for a round nozzle with no center body or a rectangular nozzle, such as those implemented in turbojet engines, demonstrate the differential vectoring effects created with asymmetric contour of the nozzle wall with resulting asymmetric sectional area ratio relative to the nozzle axis to achieve desired pressure differentials between the unchoked and choked conditions.

Referring to the drawings, FIGS. 1A-1C and 2 show a first exemplary embodiment of a turbofan engine nacelle 10 suspended from a mounting pylon 12. As in a conventional turbofan engine, a fan sleeve 14 and core cowl 16, acting as a center body, create concentric outer and inner walls for an annular or substantially annular exhaust duct and flow nozzle for a fan airstream. A standard core nozzle created by the core cowl 16 and an inner center body 18 directs jet flow from the engine core. A reference plane 20 substantially normal to an axis of the nozzle is shown in FIG. 1A and is provided as a longitudinal measurement reference for relative shaping of the nozzle surfaces, as described in greater detail below. The relative convergence and divergence of the inner and outer walls creates a minimum cross-sectional area with nozzle throat profiles that vary longitudinally along the duct in an asymmetrical manner from the top through the bottom portion.

Figure 1B:
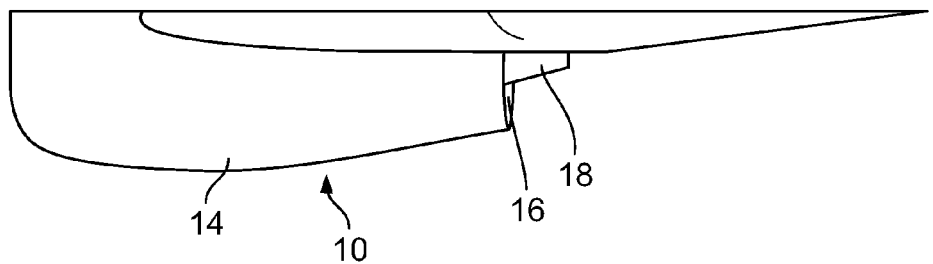
FIG. 1B is a top view of a single side of the nacelle of FIG. 1A which is symmetric about a midplane.
Figure 1C:
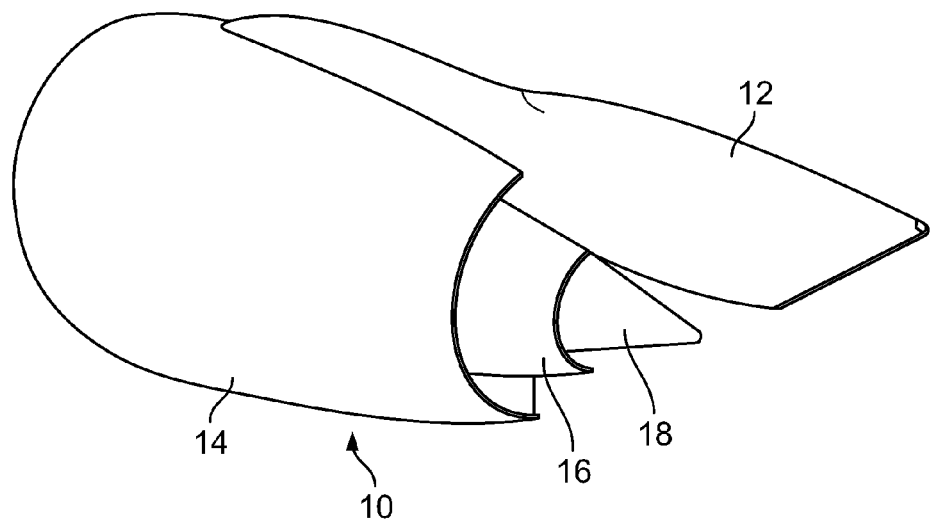
FIG. 1C is an isometric view of the nacelle of FIG. 1A.
Figure 2:
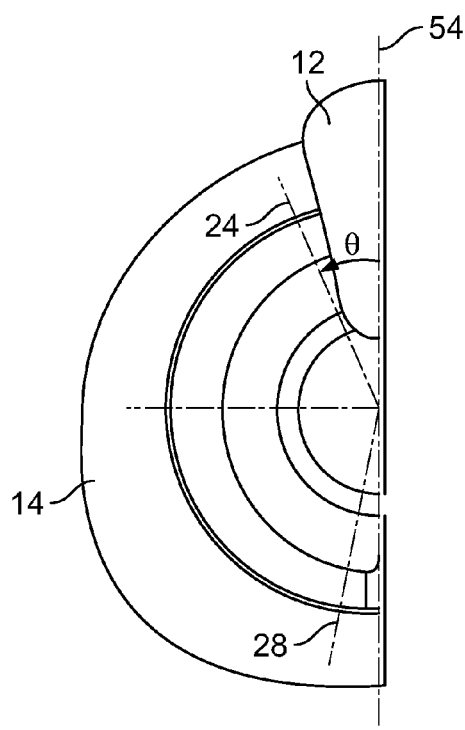
FIG. 2 is a rear view of the nacelle of FIG. 1A.
Figure 3A:
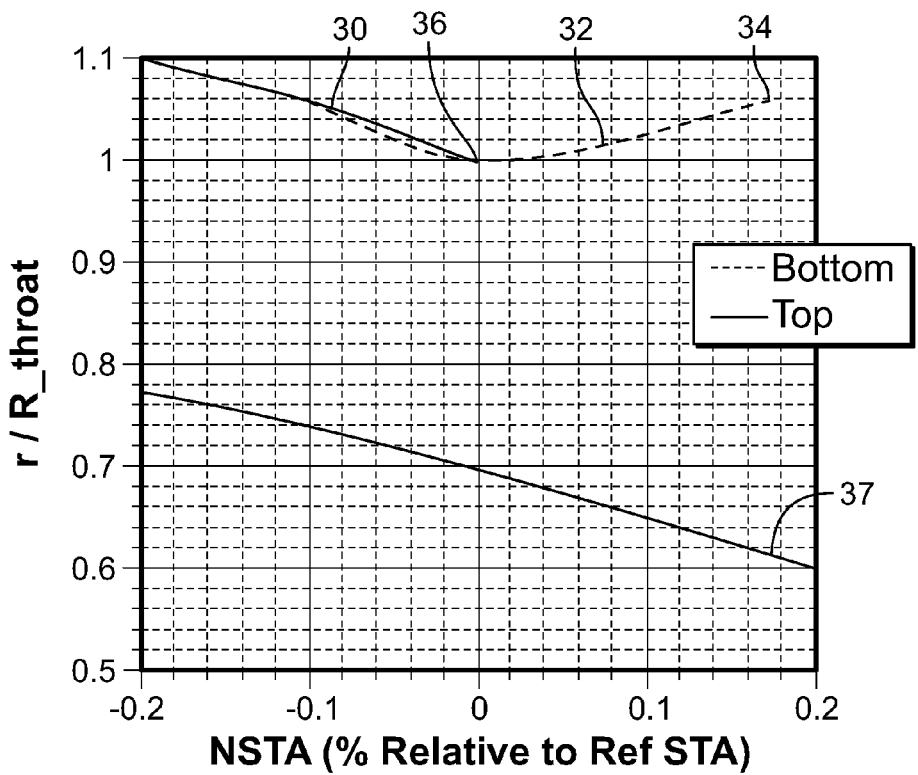
FIG. 3A is a graph of normalized radius of the core cowl and fan sleeve at selected locations relative to a longitudinal reference station.

A top inner profile of the fan sleeve represented as line 22 shown in FIG. 1A taken in the plane represented by line 24 in FIG. 2 and a bottom inner profile as represented by line 26 shown in FIG. 1A taken in the plane represented by line 28 in FIG. 2 is shown in FIG. 3A. In the example of FIG. 3A, trace 30 represents the radius of the top inner profile, represented by line 22 in FIG. 1A, and trace 32 represents the radius of the bottom inner profile, represented by line 26 in FIG. 1A. The profile radius (ordinate) for the concentric walls is shown relative to longitudinal nacelle station (abscissa), in the engine with an origin located at plane 20, which is described above. As shown in FIGS. 1 and 3A, a lip or exit 34 of the bottom inner profile extends beyond an exit 36 of the top inner profile creating a non-constant station outlet for the embodiment shown. A non-constant station outlet may be non-constant station, canted, non-planar, truncated or extended relative to the reference plane 20. The radius of the core cowl 16 forming the inner wall of the fan nozzle is shown as trace 37 in FIG. 3A.

Figure 3B:
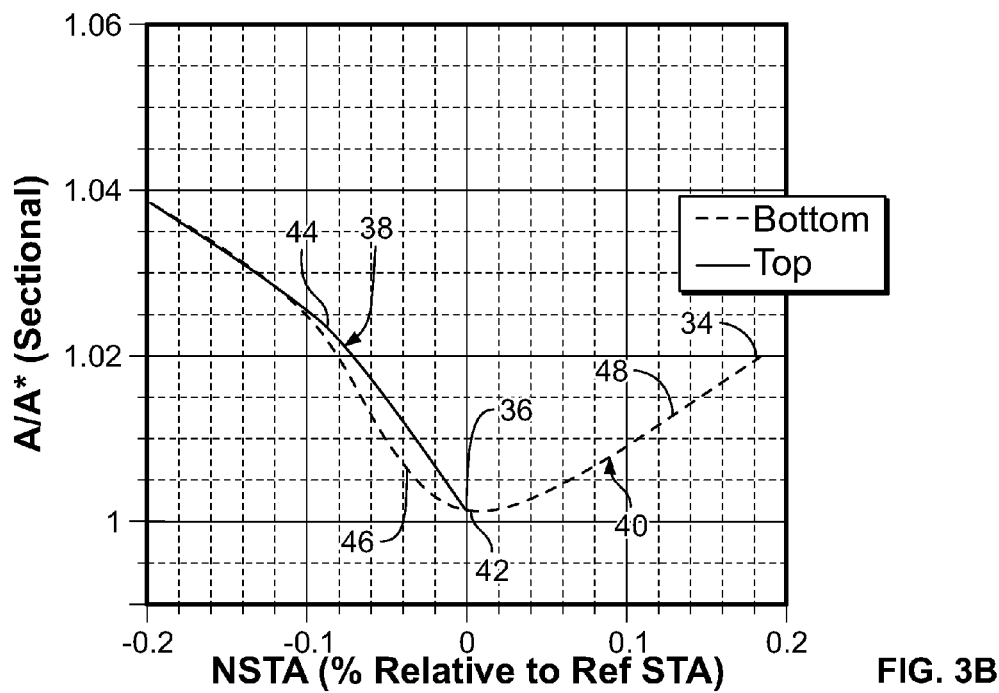
FIG. 3B is a graph of normalized sectional area of the fan nozzle at selected locations relative to a longitudinal reference station.

The resulting local normalized cross-sectional flow area, A, divided by area at the throat, A*, or A/A* of the fan nozzle is shown in FIG. 3B with the area along the top inner profile shown as trace 38 and the area along the bottom inner profile shown as trace 40. In such embodiments, a resulting nozzle throat 42 with respect to the bottom inner profile is proximal to the reference plane 20, while with respect to the top inner profile the throat 42 is coincident with the exit 36, also proximal to the reference plane 20. The asymmetric nature of the fan nozzle may be visualized by, for example, comparing a convergent section 46 of the bottom inner profile area approaching the throat 42 and a divergent section 48 between the throat 42 and the exit 34 of the bottom inner profile and a converging upper section 44 terminating at the exit 36 of the top inner profile.

The asymmetry of the fan nozzle created by the varying profile from the top inner profile to the bottom inner profile as defined above provides vectoring of the fan plume differentially depending on operating condition of, for example, a corresponding aircraft. The vectoring transition occurs between nozzle pressure ratios of approximately 1.6 to 1.9 for an exemplary embodiment. At pressure ratios less than a nozzle choke threshold, the asymmetric diverging nozzle profile creates a relative low pressure region near a bottom portion 28 of the nozzle relative to a top portion 24 (shown in FIG. 2). The flow at the top portion of the nozzle is at relatively higher pressure. This pressure differential results in the nozzle flow pointing downward away from the wing and/or flaps. At an approximate nozzle pressure ratio of greater than $((\gamma+1)/2)^{\gamma/(\gamma-1)}$, where $\gamma$ is the specific heat ratio, a one dimensional sonic wave is created in the nozzle which results in substantially equal pressure in the top and bottom portions of the nozzle providing axially symmetric flow. The dual flow control nature of the fan nozzle profiles in the top portion 24 and the bottom portion 28 of the nozzle differentially act on the flow based upon the nozzle operating subsonically (nozzle pressure ratio <1.89 for air as in take-off or approach) or supersonically (nozzle pressure ratio ≥1.89 for air as in higher altitude climb and cruise). The potential vector differential is on the order of 2 degrees.

Figure 4A:
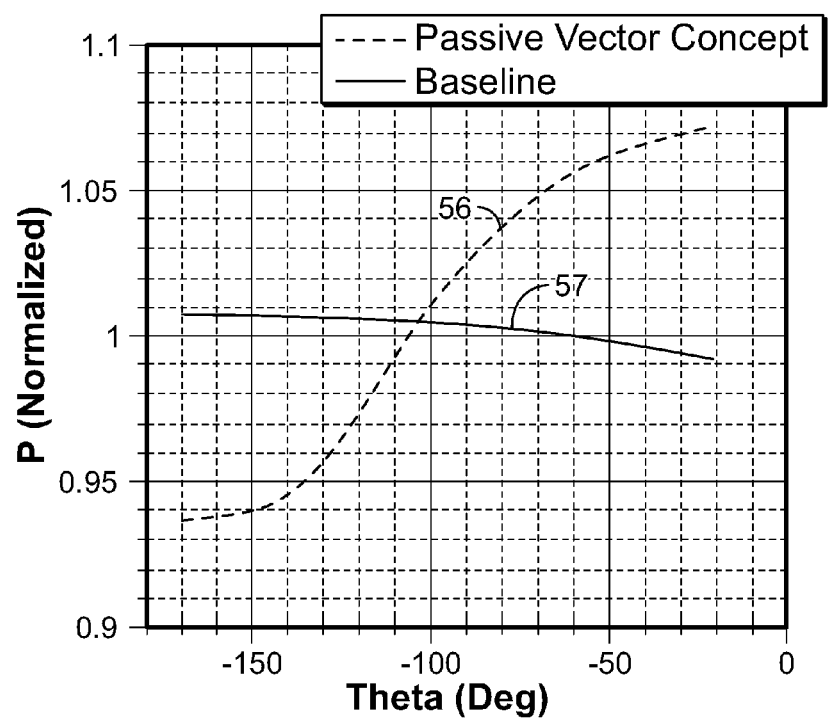
FIG. 4A is a graph of normalized pressure of the nozzle in an unchoked operating condition measured at clock angles relative to the midplane.

Demonstrating the pressure differential with respect to a clocking angle $\theta$ about an engine centerline originating at a top of a midplane 54 (FIG. 2) and in the vicinity of the reference plane 20 (FIG. 1), FIG. 4A shows a trace 56 for normalized pressure, $P_n$, as a function of $\theta$ for an unchoked nozzle. Values in excess of one for $P_n$ indicate a local static pressure greater than an average whereas values less than one indicate local static pressure less than the average. For $\theta$ between about −30° and −90° (nominally the top portion of the nozzle) pressure is significantly greater than from $\theta$ between about −90° and −180°. The differential is particularly apparent when compared to normalized pressure of a baseline symmetrical fan nozzle represented by trace 57. At nozzle pressure ratios greater than the threshold providing a choked condition in the nozzle, shown in FIG. 4B, normalized pressure remains substantially constant between the top portion and bottom portion of the nozzle as shown by trace 58 with a similar distribution profile to that of a comparable conventional fan nozzle as shown by trace 59.

Figure 4B:
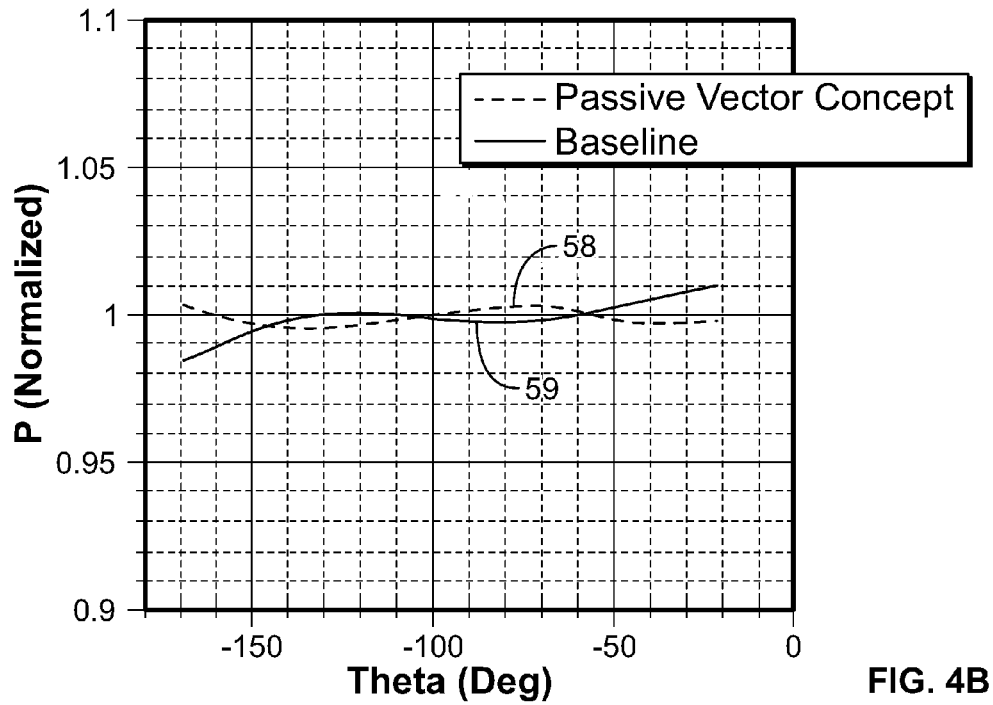
FIG. 4B is a graph of normalized pressure measured at clock angles relative to the midplane for the nozzle operating in the choked condition.
Figure 4C:
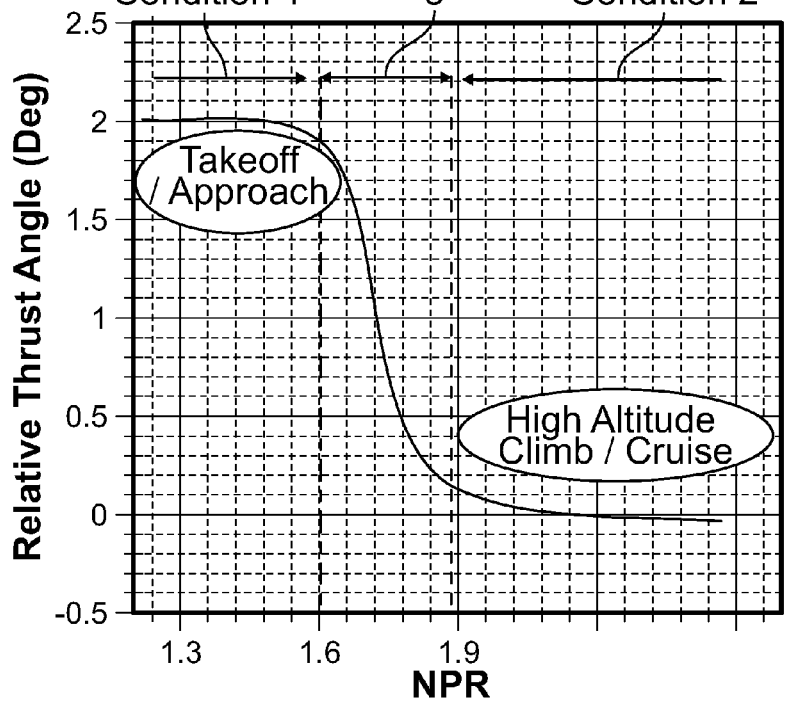
FIG. 4C is a graph of thrust differential vectoring as a function of nozzle pressure ratio.

The difference in the pressure distributions of FIGS. 4A and 4B results in the differential thrust vectoring shown in FIG. 4C. A first vectoring region 60 occurs when flow through the nozzle is unchoked. Pressure differential is created by the asymmetrical nozzle geometry and flow turning for vectoring of approximately 2° between the choked and unchoked operating conditions. Above a threshold pressure ratio (e.g., 1.6 for the illustrated example) a transition region 61 is entered in which the nozzle becomes partially choked, reducing the relative pressure differential and reducing vectoring. Above a second pressure ratio (e.g., 1.89 for air) the nozzle is fully choked in region 262 and the nozzle geometry acts uniformly on the flow at the nozzle throat which may be located upstream of the nozzle exit, as described in detail below. The uniformity of the pressure results in flow exiting the nozzle up to 2° different from the unchoked condition.

Figure 5A:
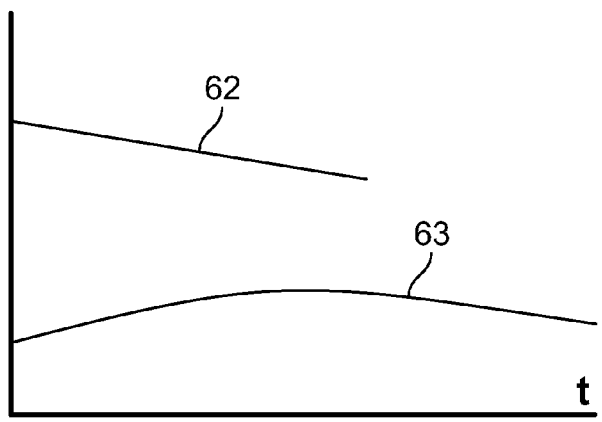
FIGS. 5A-5C are graphs of radii of the core cowl/fan nozzle inner wall and fan sleeve at upper, midline and bottom sections of a conventional baseline fan nozzle.
Figure 5B:
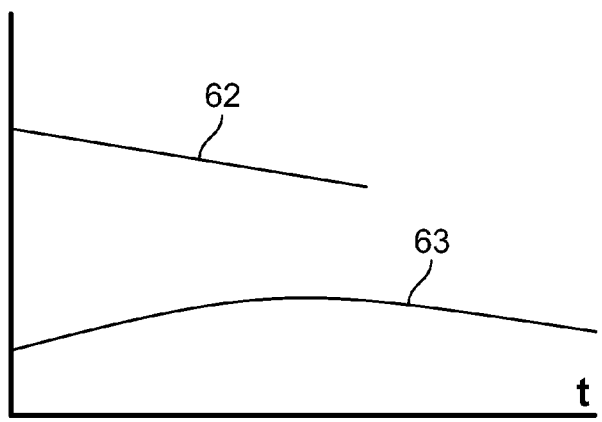
Figure 5C:
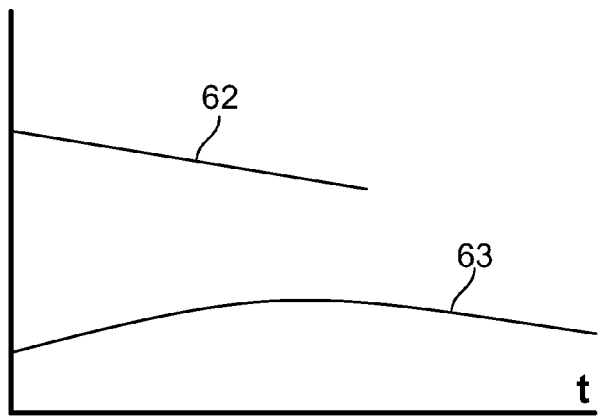

A conventional nozzle is symmetric around a nozzle axis. As a baseline representation for inner and outer wall profiles, FIGS. 5A-5C represent longitudinal profiles of the baseline fan nozzle bounding walls for the fan sleeve (trace 62) and core cowl (trace 63) at $\theta$ sections of approximately (e.g., within a threshold) −30° (FIG. 5A), −90° (FIG. 5B) and −180° (FIG. 5C). The geometry in the baseline nozzle is independent of the $\theta$ angle. The nozzle may be convergent or convergent-divergent in area ratio. The wall profiles are substantially (e.g., within a threshold) symmetrically constant resulting in sectional characteristics of curvature and sectional area ratio being constant from top to bottom. The curvatures in the baseline nozzle are representative of a starting geometry for modification with respect to curvatures and symmetry to create the differential vectoring of the embodiments disclosed herein. Actual dimensions and curvature of the nozzle will depend on the engine size, application and numerous operating parameters which are substantially irrelevant to achieving the desired differential vectoring. The specific nozzle shaping and asymmetric differential from top to bottom as well as longitudinal profile of the fan nozzle may be tailored for specific engines, operating conditions and desired vectoring performance.

Figure 6A:
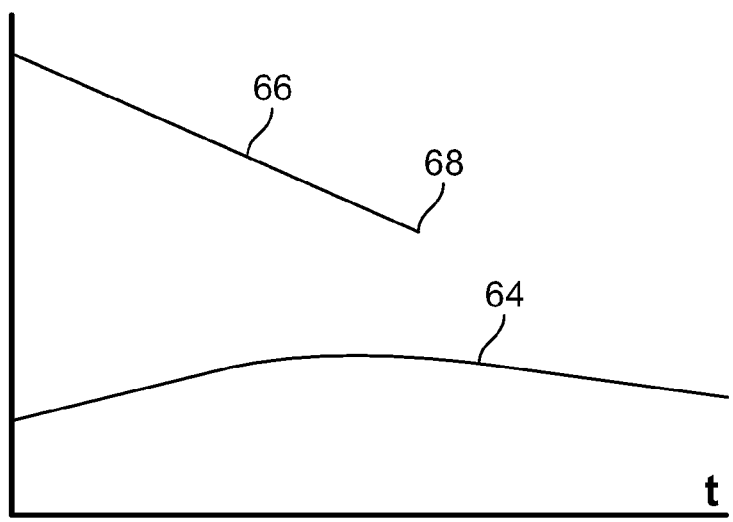
FIGS. 6A-6C are graphs of radii of the core cowl and fan sleeve at upper, midline and bottom sections of the fan nozzle for a first embodiment.
Figure 6B:
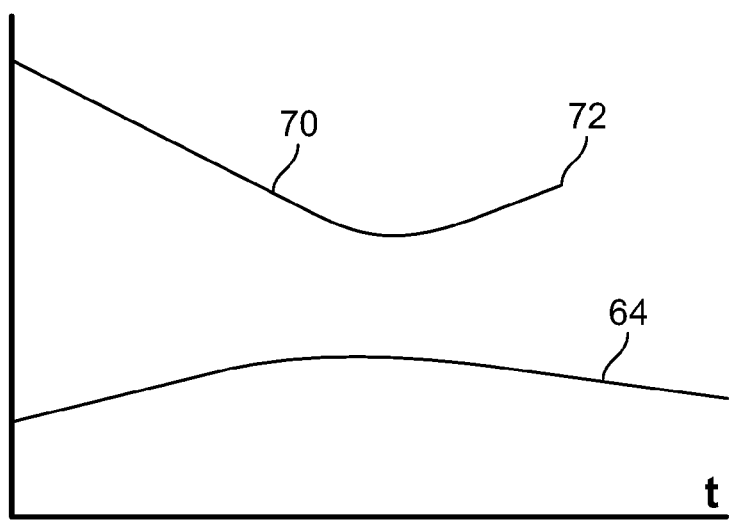
Figure 6C:
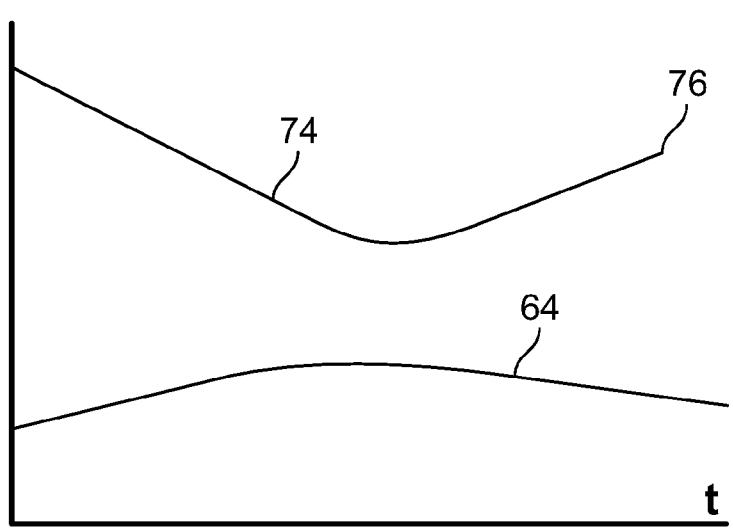

FIGS. 6A-6C illustrate an example embodiment in which longitudinal profiles of the radius are taken from the nozzle axis for the fan sleeve and core cowl at θ sections of approximately −30° (FIG. 6A), −90° (FIG. 6B) and −180° (FIG. 6C). In the example of FIGS. 6A-6C, the inner wall provides constant longitudinal profile (trace 64) with associated relative curvature comparable to the baseline as in FIGS. 5A-5C, and is not a direct contributor to nozzle differential vectoring. In contrast to the baseline symmetric nozzle of FIGS. 5A-5C, the contour of the outer nozzle wall created by the fan sleeve in the example of FIGS. 6A-6C varies from a first longitudinal profile 66 with associated relative curvature terminating at an exit 68 at θ≃−30° to an interim longitudinal profile 70 with associated relative curvature terminating at an exit 72 at θ≃−90° to a final longitudinal profile 74 with associated relative curvature terminating at exit 76 at θ≃−180°. In the example of FIGS. 6A-6C, the amount of con-di increases toward the bottom portion of the nozzle to create lower pressure than the top portion of the nozzle therefore inducing top-to-bottom flow within nozzle when it is unchoked. In the example of FIGS. 6A-6C, the length of the extension to the exit (represented graphically in FIGS. 6A-6C as traces 68, 72, and 76) provides the over-area or con-di that vectors the flow. The length of the extension controls the amount of con-di in the nozzle. The longer the curve, the greater the A/A* of the nozzle. The example of FIGS. 6A-6C relies primarily on the profile of the outer wall provided by the fan sleeve to generate lower pressure at the nozzle bottom relative to nozzle top. When the nozzle is choked, the pressure at the nozzle throat becomes nearly uniform, as in FIG. 4B. This creates the differential vectoring between lower speed (e.g., take-off, unchoked) and higher speed (e.g., cruise, choked) operation.

Figure 7A:
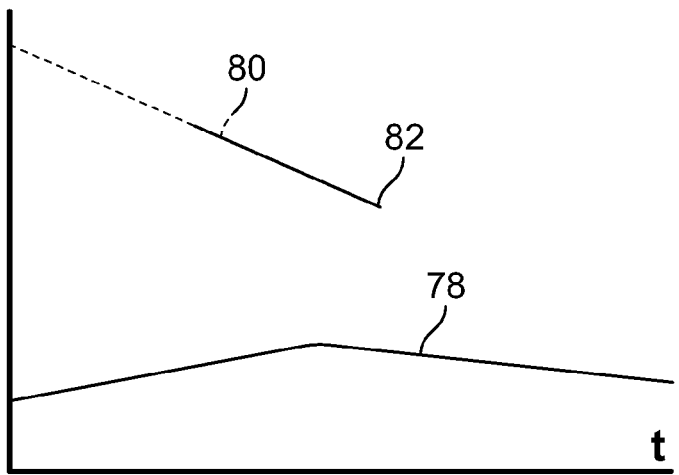
FIGS. 7A-7C are graphs of radii of the core cowl and fan sleeve at upper, midline and bottom sections of the fan nozzle for a second embodiment.
Figure 7B:
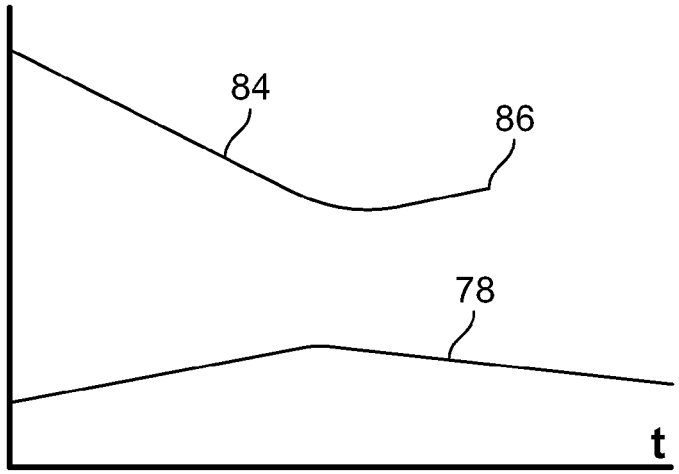
Figure 7C:
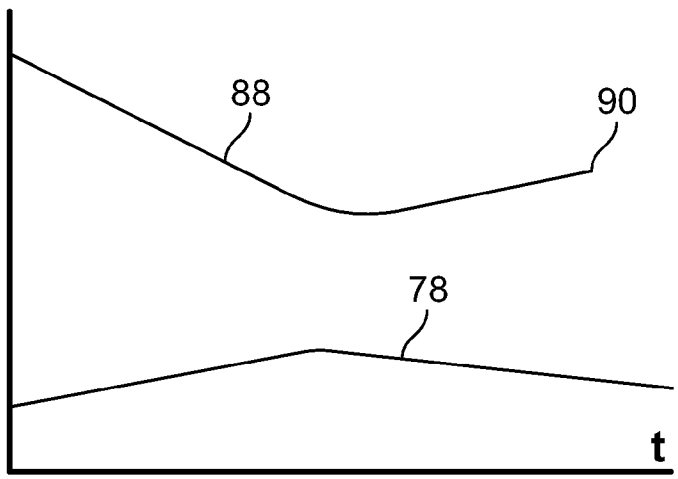

FIGS. 7A-7C illustrate an example embodiment in which longitudinal profiles of the radius for the fan sleeve and core cowl are taken at θ sections of approximately −30° (FIG. 7A), −90° (FIG. 7B) and −180° (FIG. 7C). Inner wall longitudinal profile 78 with associated curvature provided by the core cowl in the example of FIGS. 7A-7C is increased beyond that of the baseline nozzle in FIGS. 5A-5C and that of the example of FIGS. 6A-6C to lower local pressure to allow the example of FIGS. 7A-7C to be as effective as the example of FIGS. 6A-6C, but with less overall con-di. Although curvature in the profile 78 of FIGS. 7A-7C is increased, it is still axi-symmetric as in the example of FIGS. 6A-6C. The amount of con-di of the outer wall again increases towards bottom portion of the nozzle, as shown, to create lower pressure than the top portion of the nozzle and, therefore, induces top-to-bottom flow within nozzle. Similar to the symmetric baseline geometry of FIGS. 6A-6C, the contour of the outer wall created by the fan sleeve in the example of FIGS. 7A-7C varies from a first longitudinal profile 80 with associated relative curvature terminating at exit 82 at θ≃−30° to an interim longitudinal profile 84 with associated curvature terminating at exit 86 at θ≃−90° to a final longitudinal profile 88 with associated curvature exit 90 at θ≃−180°. The example of FIGS. 7A-7C requires less con-di than the example of FIGS. 6A-6C due to local high curvature on the inner wall through the throat. As with the example of FIGS. 6A-6C, the extension of the outer wall from the throat to the exit provides the divergence in the nozzle to control the flow. However, the example of FIGS. 7A-7C uses both con-di on the outer wall and relatively higher curvature of the inner wall. This induces the desired top-to-bottom flow within the nozzle at unchoked pressure ratios that becomes symmetric when the nozzle is operating choked to create the differential vector between lower speed (e.g., take-off, unchoked) and higher speed (e.g., cruise, choked). The example of FIGS. 7A-7C utilizes less con-di than the example of FIGS. 6A-6C, and relies instead on greater inner wall curvature to be as effective as the example of FIGS. 6A-6C.

Figure 8A:
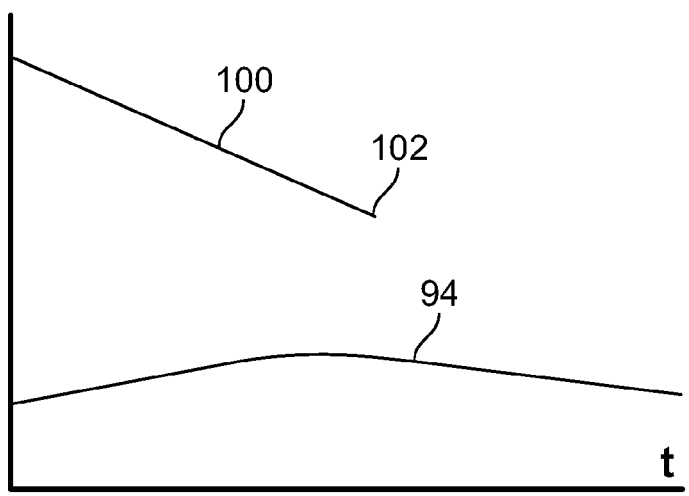
FIGS. 8A-8C are graphs of radii of the core cowl and fan sleeve at upper, midline and bottom sections of the fan nozzle for a third embodiment.
Figure 8B:
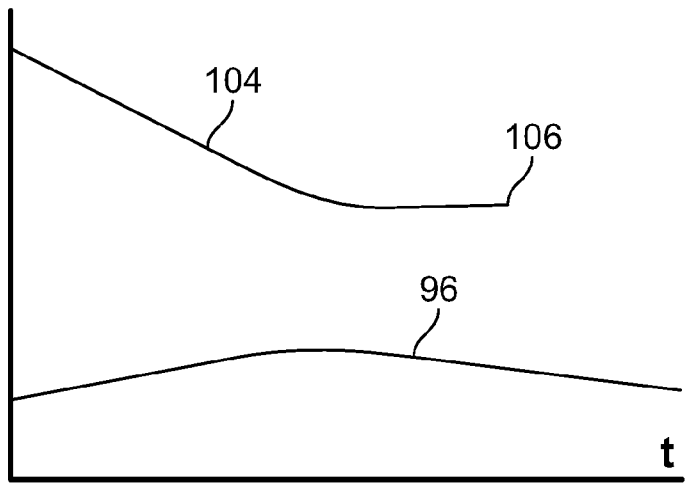
Figure 8C:
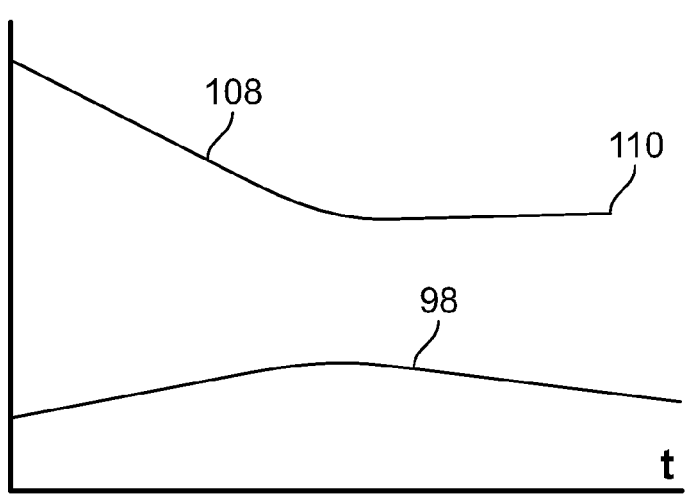

FIGS. 8A-8C illustrate an example embodiment in which longitudinal profiles of the radius for the fan sleeve and core cowl are taken at θ sections of approximately −30° (FIG. 8A), −90° (FIG. 8B) and −180° (FIG. 8C). Unlike the constant curvature of the baseline inner wall of FIGS. 5A-5C, the curvature of the inner wall (the core cowl) in the example of FIGS. 8A-8C is greater at the bottom of the nozzle than the top with a longitudinal profile 94 and associated curvature at θ=−30°, longitudinal profile 96 and associated curvature at θ=−90° and longitudinal profile 98 with associated curvature at θ=−180°. In the example of FIGS. 8A-8C, the curvature of the inner wall varies from top (FIG. 8A) to bottom (FIG. 8C) by a factor of four. This reduces the need for con-di resulting from the outer wall shape relative to the example of FIGS. 6A-6C or the example of FIGS. 7A-7C while maintaining effectiveness. The contour of the outer wall created by the fan sleeve the example of FIGS. 8A-8C is a first longitudinal profile with associated relative curvature terminating at exit 102 at θ=−30° to an interim longitudinal profile 104 with associated relative curvature terminating at exit 106 at θ=−90° to a final longitudinal profile 108 with associated relative curvature terminating at exit 110 at θ=−180°. This configuration also creates the differential vector between lower speed (e.g., take-off, unchoked) and higher speed (e.g., cruise, choked) operation. The example of FIGS. 8A-8C requires less con-di than the example of FIGS. 7A-7C, but requires instead greater inner wall curvature at the bottom relative to the top to be as effective as the example of FIGS. 7A-7C at differential vectoring.

The asymmetry of the con-di and/or curvature from the upper portion of the nozzles to the lower portion of the nozzles as described for the three above examples (the example of FIGS. 6A-6C, the example of FIGS. 7A-7C, and the example of FIGS. 8A-8C) results in some degree of area ratio flare and nozzle wall curvature concentration located at or near the bottom portion of the nozzle. For the commercial turbofan nozzles as described with respect to FIGS. 1A-C, 10A-C and 12A-C, this is farthest from the wing resulting in vectoring flow away from the wing in the subsonic condition.

While described herein with the asymmetry referenced to a clock angle from a vertical midplane of the engine for desired downward vectoring of the jet plume to reduce interaction with an aircraft wing and flaps under which the engine is mounted, vectoring using the embodiments disclosed herein may be accomplished in any desired direction between a first portion of the nozzle and a second portion of the nozzle having greater area ratio and/or curvature to reduce pressure thereby vectoring the flow by inducing flow from the first portion toward the second portion below the threshold pressure ratio for an unchoked condition but providing no vectoring above the threshold with the nozzle choked.

Figure 9:
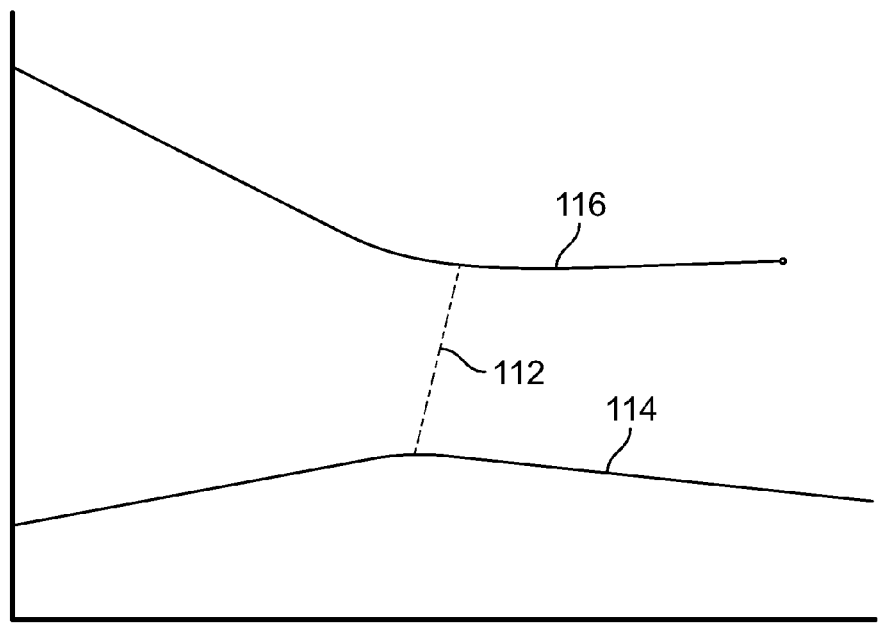
FIG. 9 is a graph of radii of the core cowl and fan sleeve demonstrating operation at cruise with sonic flow at the nozzle throat.
Figure 10A:
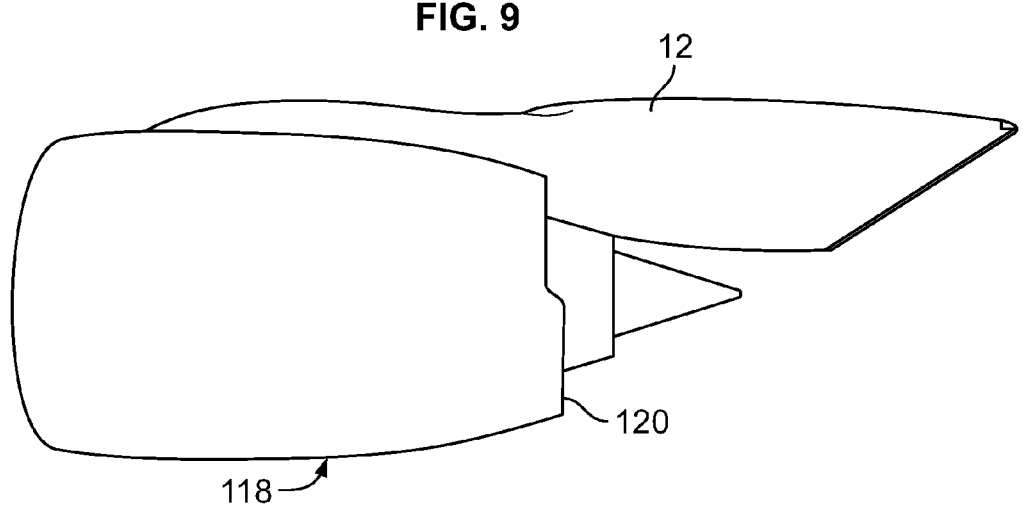
FIGS. 10A, 10B and 10C are side, top and isometric views of a fourth embodiment in a turbofan nacelle.
Figure 10B:
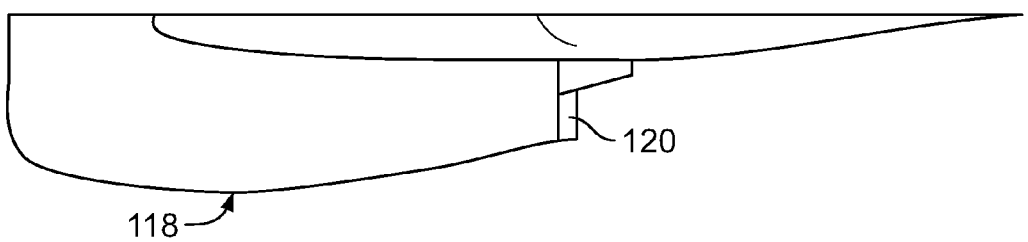
Figure 10C:
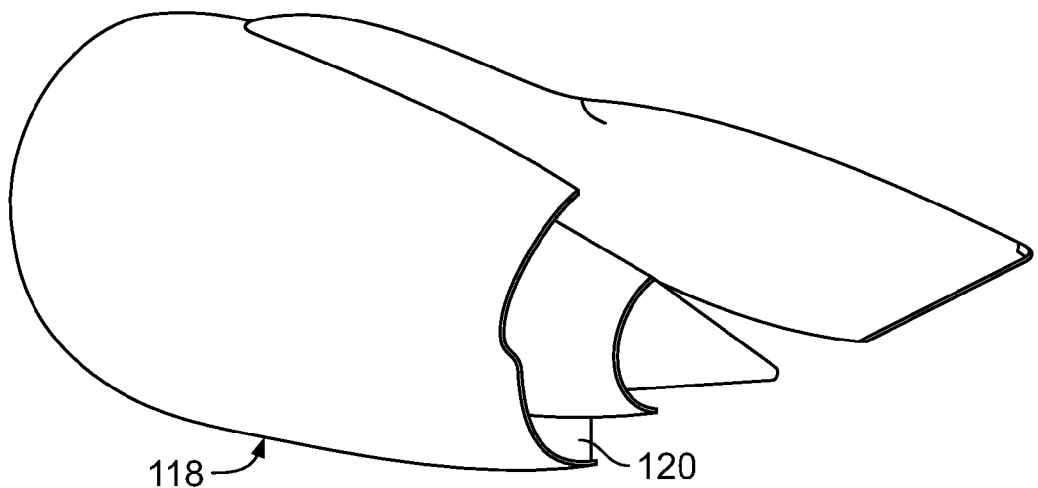
Figure 11:
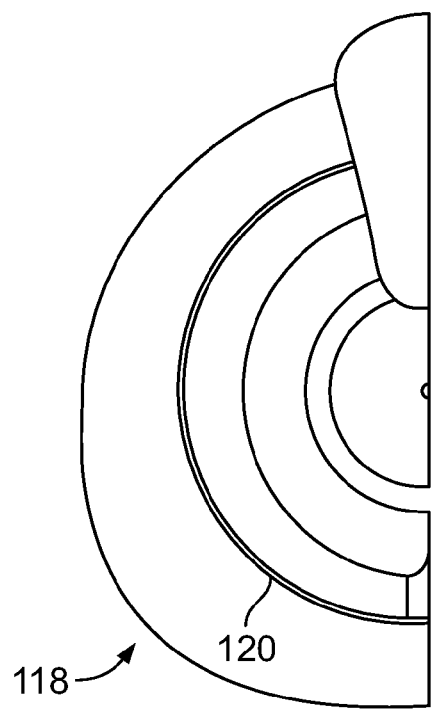
FIG. 11 is a rear view of the nacelle of FIGS. 10A, 10B and 10C.
Figure 12A:
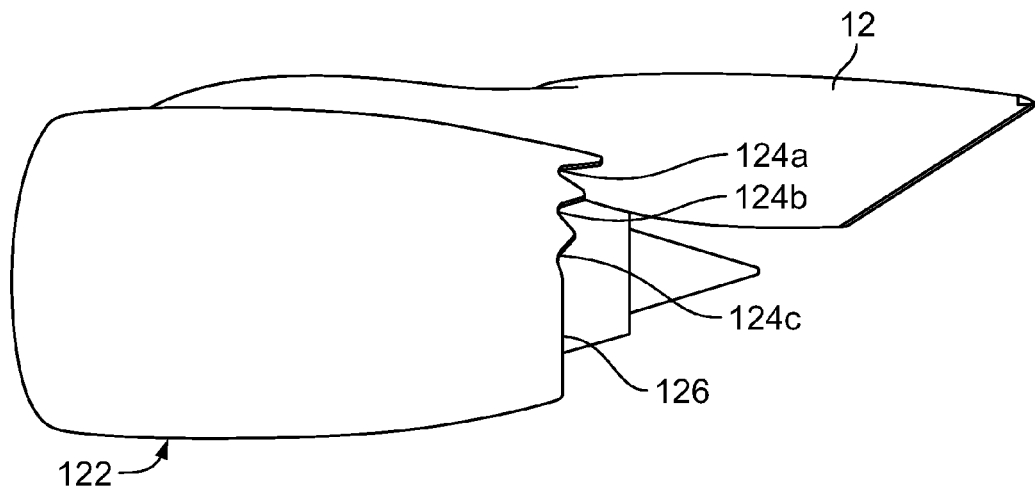
FIGS. 12A, 12B and 12C are side, top and isometric views of a fifth embodiment in a turbofan nacelle.
Figure 12B:
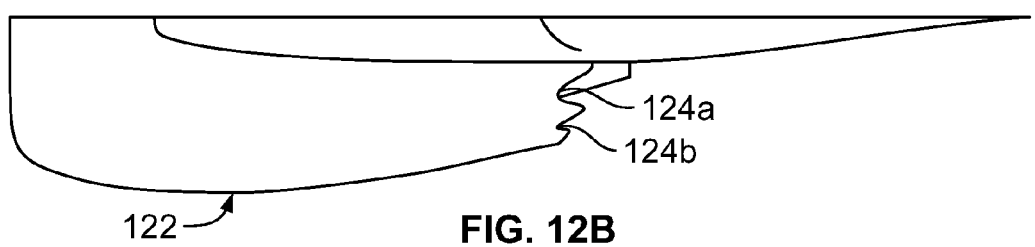
Figure 12C:
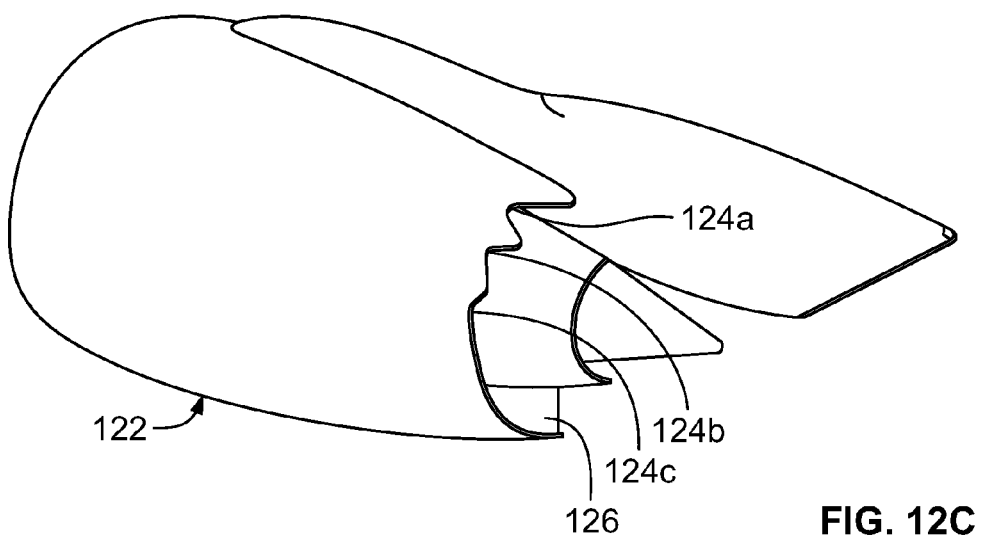
Figure 13:
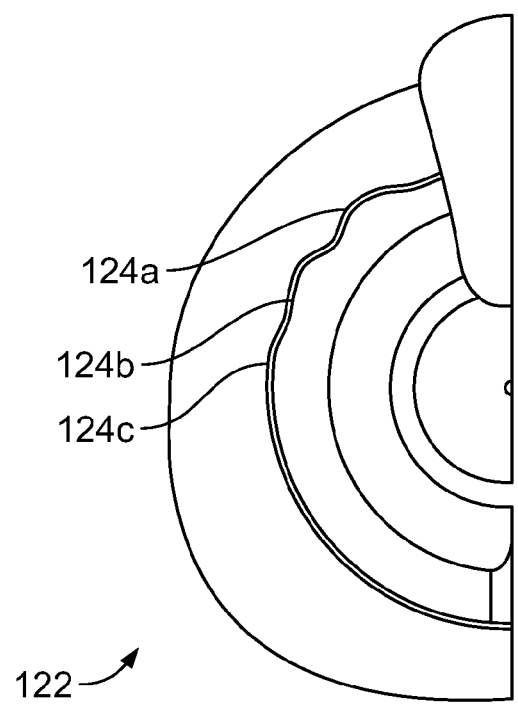
FIG. 13 is a rear view of the nacelle of FIGS. 12A, 12B and 12C.

For each of the embodiments disclosed herein, once the nozzle is operated choked (e.g., greater than the threshold pressure ratio), pressure in the region represented by line 112, shown in FIG. 9 in a representative section of the nozzle having an inner wall profile 114 and an outer wall profile 116 transitions to a near constant value from the top of the nozzle to the bottom, as depicted in FIG. 4B. This near constant value pressure differential removes the inducement for vectoring of the flow. This difference in relative pressures created by the choked or unchoked operating condition leads to a differential vector between lower speed (e.g., take-off unchoked conditions) and higher speed (e.g., cruise choked conditions) operation.

The actual nozzle exit configuration may vary depending on the operational requirements of the engine. Example configurations for a turbofan engine common to commercial aircraft usage shown in FIGS. 10A-10C and 11 include a nacelle 118 having a bottom chin 120 as opposed to a linear non-constant station shape of the exit. Tailoring of fan sleeve and core cowl curvatures for this configuration (as previously described in connection with the examples of FIGS. 6A-6C, 7A-7C, and 8A-8C) can be accomplished for the desired asymmetric pressure generation at unchoked flow conditions to provide differential vectoring of the flow. The example embodiment represented in FIGS. 10A-10C and 11 is similar to the embodiment represented in FIGS. 1A-1C and 2, except that the exit is no longer a single plane, with a linearly varying exit as a function of angular position but, rather, two separate offset planes. The two offset planes shown are perpendicular to the nozzle axis for the embodiment of FIGS. 10A-10C and 11, and rather than smoothly varying the con-di from the top to the bottom, there is a narrow blend region between the two planes, near the half-breadth ($\theta=-90°$). Similarly, in some embodiments involving a nacelle 122 illustrated in FIGS. 12A-12C and 13, additional flow modification systems such as chevrons 124a 124b and 124c, (and symmetric chevrons on the opposite side of pylon 12) may extend from an upper portion of trailing edge 126 of the fan sleeve. For the illustrated example of FIGS. 12A-12C and 13, six chevrons extend over approximately the top 25% of the circumference of the fan nozzle exit. The chevrons closest to the pylon 12, 124a and the symmetric chevron on the opposite side of the nacelle pylon extend farther aft for enhanced mixing in the upper portion of the flow. The chevrons of the illustrated example locally induce vortical mixing in the top region of the flow to reduce a velocity gradient across the plume, locally redistributing energy away from the wing and/or flaps region. The embodiment represented in FIGS. 12A-12C and 13 differs from that represented in FIGS. 10A-10C and 11 with the addition of chevrons to the portion of the nozzle proximate the wing and flaps. Chevrons may be used to increase the pressure in the top portion of the nozzle in the region of the reference plane 20 (FIG. 1). In some embodiments, a larger number of chevrons may be employed or none at all.

Although the embodiments disclosed herein contain non-constant nacelle station nozzle exits, some embodiments may contain constant nacelle station nozzle exits with similar differential vectoring performance.

Figure 14:
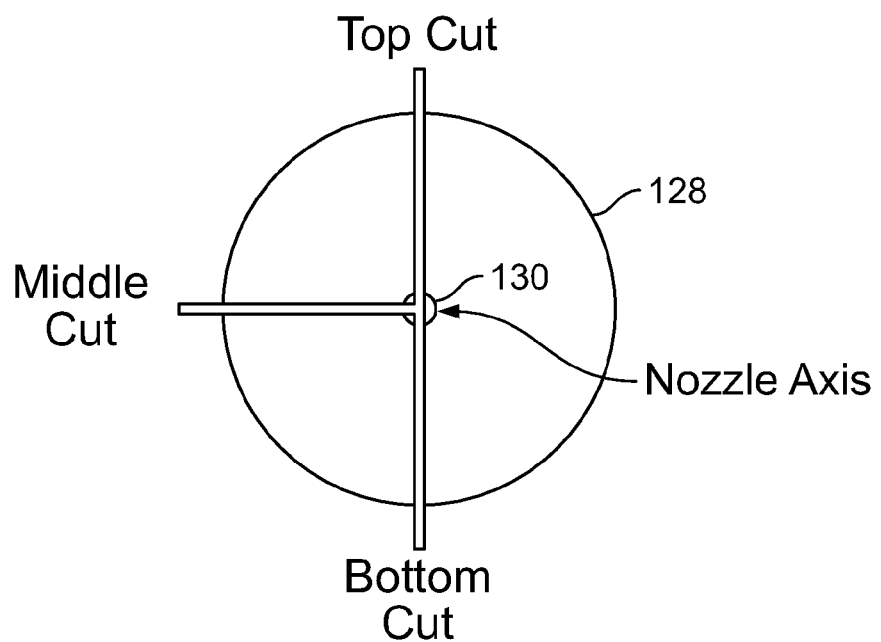
FIG. 14 is a rear view of a round nozzle without centerbody for a jet engine.
Figure 15A:
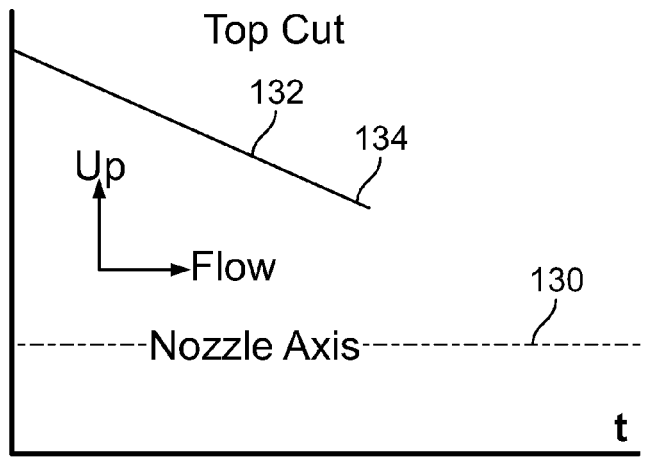
FIGS. 15A, 15B and 15C are graphs of nozzle wall radii relative to a nozzle axis for upper, midline and bottom sections of the round nozzle of FIG. 14.
Figure 15B:
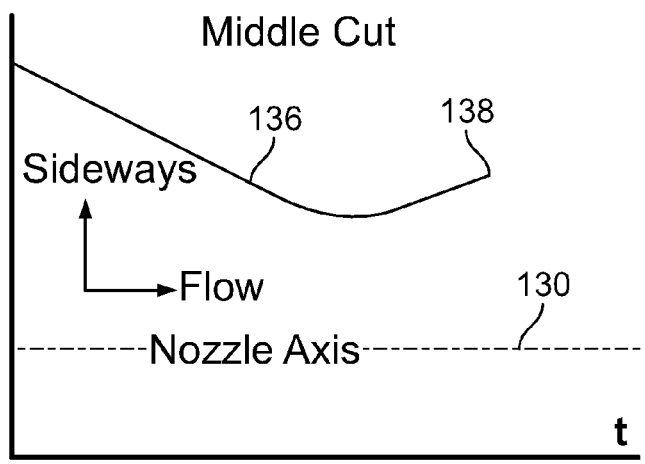
Figure 15C:
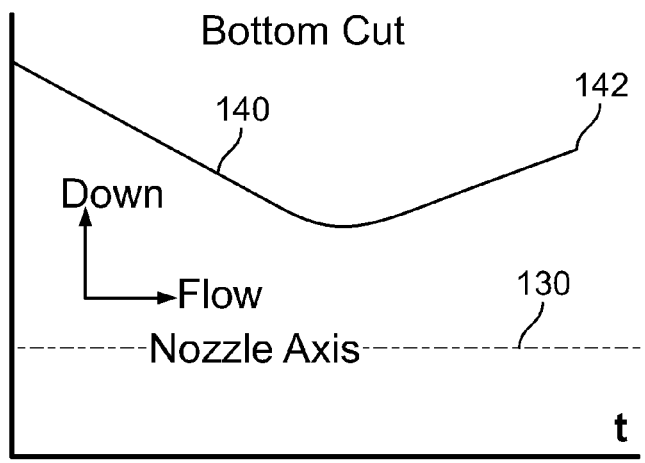

A round nozzle 128 or rectangular nozzle without a centerbody is illustrated in FIG. 14. The example of FIG. 14 may employ asymmetric curvature between opposing walls in the nozzle for the differential pressure generation in an unchoked condition. Contour relative to a nozzle centerline axis 130, as shown in FIGS. 15A-15C, may be employed where longitudinal profiles of the radius for the nozzle wall relative to nozzle centerline at $\theta$ sections of approximately 0° (FIG. 15A), −90° (FIG. 15B) and −180° (FIG. 15C). Contour of the outer nozzle wall varies from a first longitudinal profile 132 with associated relative curvature 132 terminating at exit 134 at $\theta=0°$ to an interim longitudinal profile 136 with associated relative curvature terminating at exit 138 at $\theta\simeq-90°$ to a final longitudinal profile 140 with associated curvature terminating at exit 142 at $\theta\simeq-180°$. The amount of con-di and/or wall curvature increases toward the bottom portion of the nozzle to create lower pressure than the top portion of the nozzle, thereby inducing top-to-bottom flow within the nozzle in the unchoked condition. This embodiment relies on the profile of the wall provided to generate lower pressure at the nozzle bottom relative to nozzle top. When the nozzle is choked, the flow becomes nearly uniform. This creates the differential vector between lower speed (e.g., take-off, unchoked) and higher speed (e.g., cruise, choked) operation.

Figure 16:
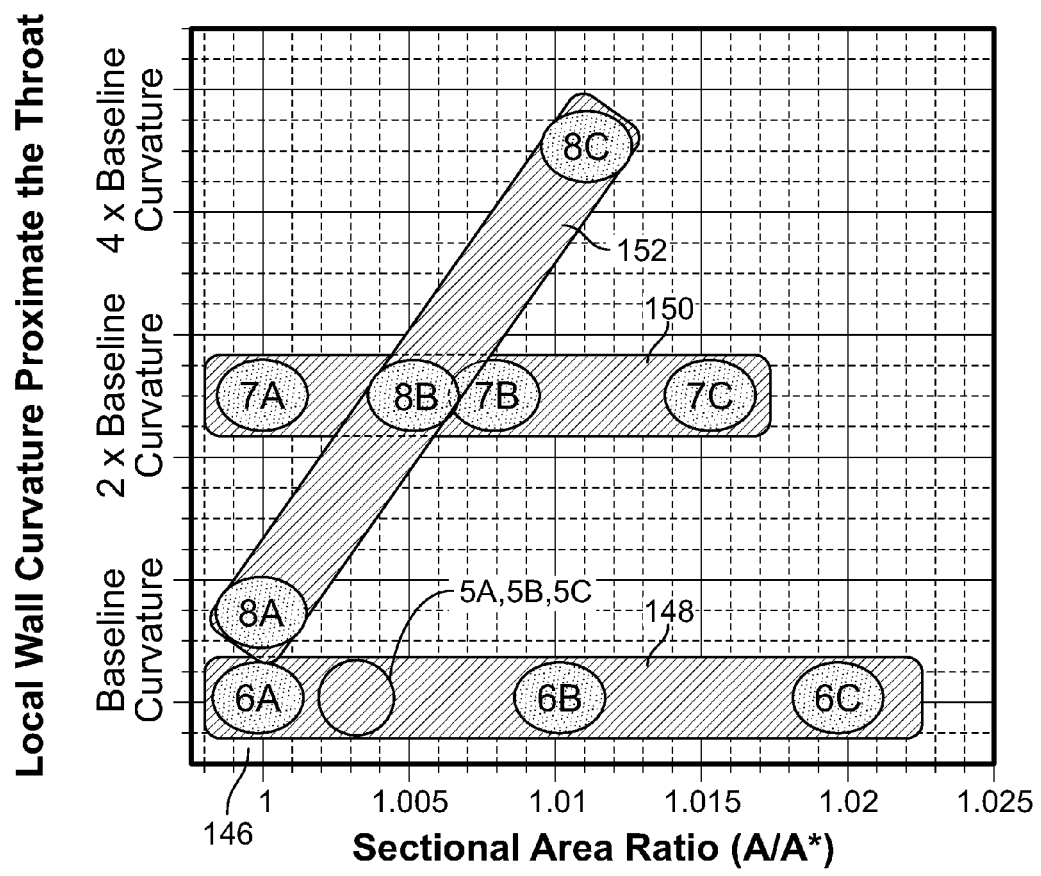
FIG. 16 is a graph of the functional relationship between nozzle curvature proximate the throat/exit and nozzle area ratio for the baseline nozzle of FIGS. 5A, 5B and 5C embodiments described in FIGS. 6A, 6B, 6C, 7A, 7B, 7C and 8A, 8B, 8C.

FIG. 16 demonstrates the varying effect of asymmetric variation of curvature and/or asymmetric sectional area ratio in the nozzle to achieve the desired pressure differential and, therefore, differential vectoring. As a known definition of curvature, let N(s) be a regular parametric curve, where s is the arc length along the longitudinal station. This determines the unit tangent vector T(s), and curvature κ(s) is defined as the first derivative of T(s) and the second derivative of N(s), κ(s)=T'(s)=N"(s). Local wall curvature (the second derivative of position) and sectional area ratio for the baseline configuration described with respect to FIGS. 5A-5C is represented in FIG. 16 as circle 146. The baseline configuration represented by FIGS. 5A-5C and shown as circle 146 in FIG. 16 can be represented as a single circle due to symmetry about the nozzle centerline, with its location on FIG. 16 notional. Circle 146 could be shown in other locations on FIG. 16 and still adequately represent the baseline configuration shown in FIGS. 5A-5C. As represented by bar 148 for the example embodiment of FIGS. 6A-6C, the sectional area ratio increases from a value of 1 the top section represented by FIG. 6A through the 90° section represented by FIG. 6B to the 180° section represented by FIG. 6C where the sectional area ratio has increased to 1.02 providing asymmetry in the area ratio from top to bottom of the nozzle. Because the local wall curvature is constant for that embodiment, bar 148 is horizontal. Similarly, the example embodiment of FIGS. 7A-7C is represented by bar 150. Again, the sectional area ratio increases from a value of 1 at the top section represented by FIG. 7A through the 90° section represented by FIG. 7B to the 180° section represented by FIG. 7C where the sectional area ratio has increased to 1.015. However, the local wall curvature is approximately 2 times the baseline curvature placing the bar upward on the graph. While the asymmetry of the sectional area ratio does not increase as much as for the example of FIGS. 6A-6C as represented by bar 148, the greater curvature results in comparable performance. Finally, the example embodiment of FIGS. 8A-8C is represented by bar 152. Again, it is seen that the sectional area ratio increases from a value of 1 at the top section represented by FIG. 8A through the 90° section represented by FIG. 8B to the 180° section represented by FIG. 8C where the sectional area ratio has increased to 1.012. In this embodiment, the local wall curvature increases at greater clock angle with approximately 2 times the baseline curvature at 90° and 4 times the baseline curvature at 180° slanting the bar upward from left to right on the graph. While the asymmetry in the sectional area ratio is not as large as for either the example of FIGS. 6A-6C or the example of FIGS. 7A-7C, asymmetry in the curvature accommodates the desired pressure differential from top to bottom on the nozzle with a combined performance comparable to both the example of FIGS. 6A-6C and the example of FIGS. 7A-7C for vectoring.

Figure 17:
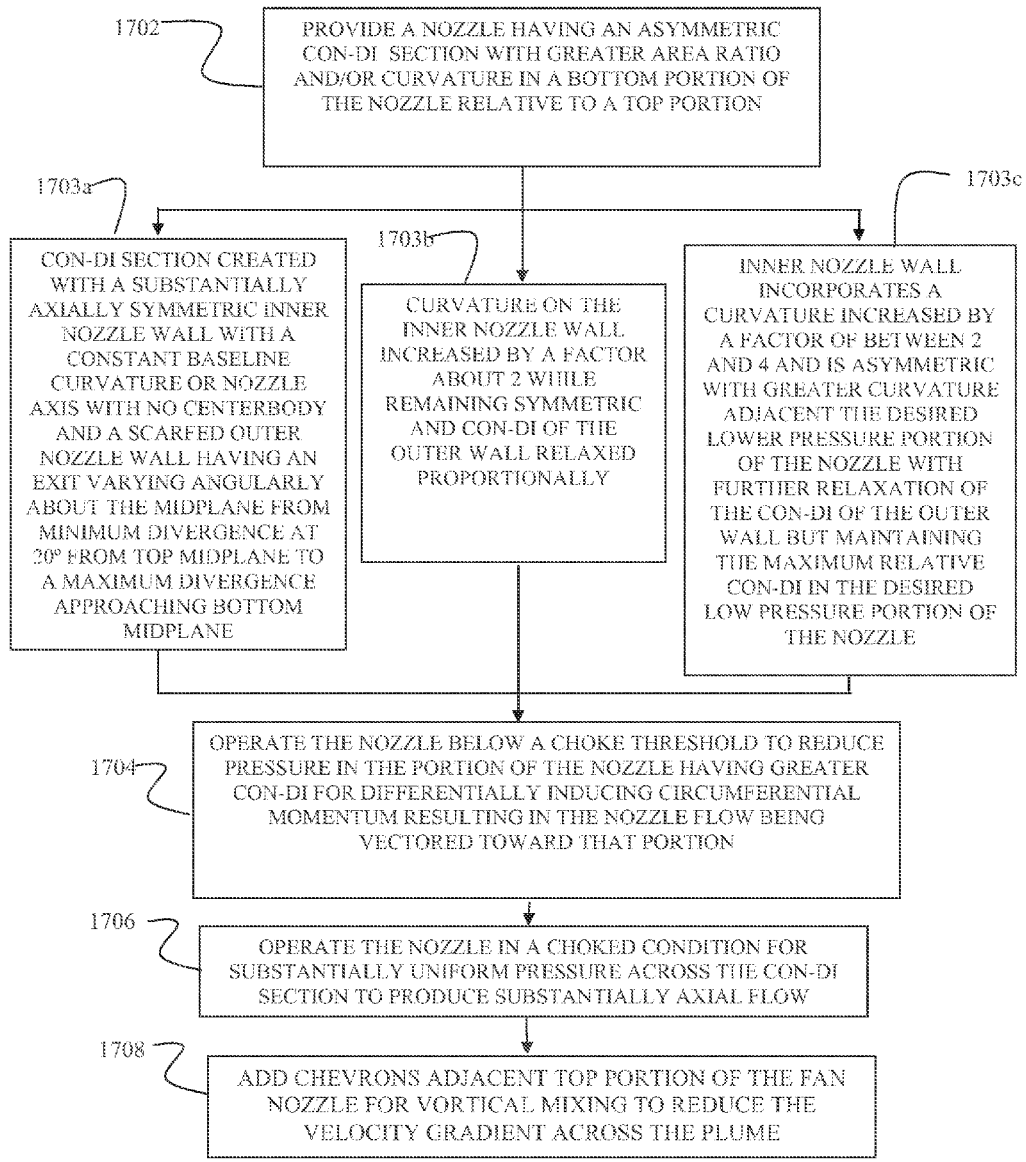
FIG. 17 is a flow chart of a method of flow vectoring employing the embodiments disclosed.

As shown in FIG. 17, an example method for flow vectoring employed by the embodiments disclosed herein is accomplished by providing an asymmetric fan nozzle having greater area ratio and curvature in a bottom portion of the nozzle relative to a top portion (block 1702). The con-di section can be created with a substantially axially symmetric inner nozzle wall with a constant curvature and a non-constant station outer nozzle wall having an exit varying angularly about the midplane from minimum divergence at 20° from top midplane to a maximum divergence approaching bottom midplane (block 1703a). Alternatively, curvature on the inner nozzle wall may be increased while remaining symmetric and area ratio of the lower sector of the outer wall relaxed proportionally (block 1703b). Finally, the inner nozzle wall may not only incorporate increased curvature but may be asymmetric with greater curvature adjacent the desired lower pressure portion of the nozzle with further reduction of the area ratio (block 1703c). Operating the nozzle below a choke threshold induces circumferential momentum resulting in the nozzle flow being vectored toward the most curved or highest area ratio portion (block 1704). Operating the nozzle above the choke threshold creates a relatively uniform pressure across the throat section of the nozzle to produce substantially axial flow (block 1706). Chevrons may be provided adjacent the top portion of the fan nozzle to induce vortical mixing for reducing the velocity gradient across the plume (block 1708), to supplement the vectoring.

Figure 18A:
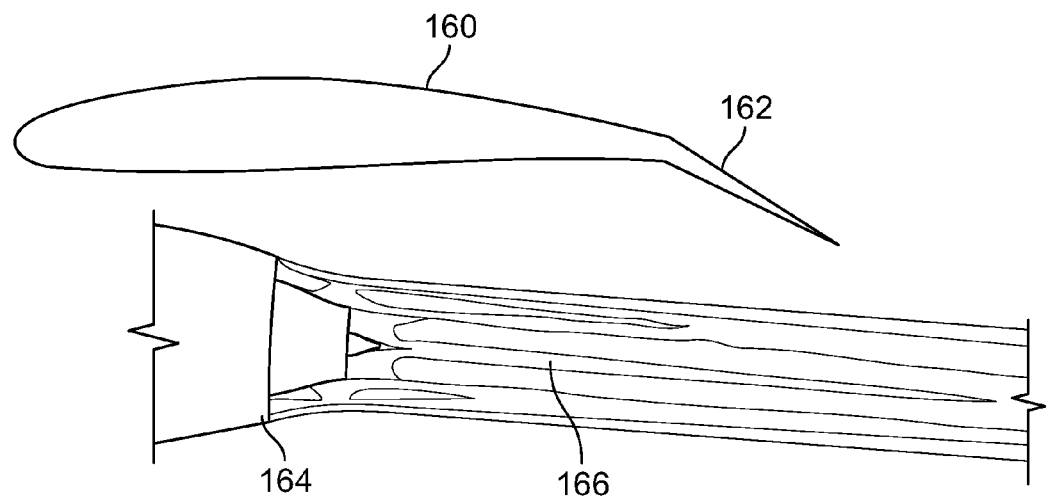
FIGS. 18A and 18B are exemplary flow visualizations for unchoked and choked flow through one embodiment for vectoring away from a wing flap; and, FIG. 19 is a diagram of shock cells and acoustic energy associated with shock cells that are mitigated by disclosed embodiments.
Figure 18B:
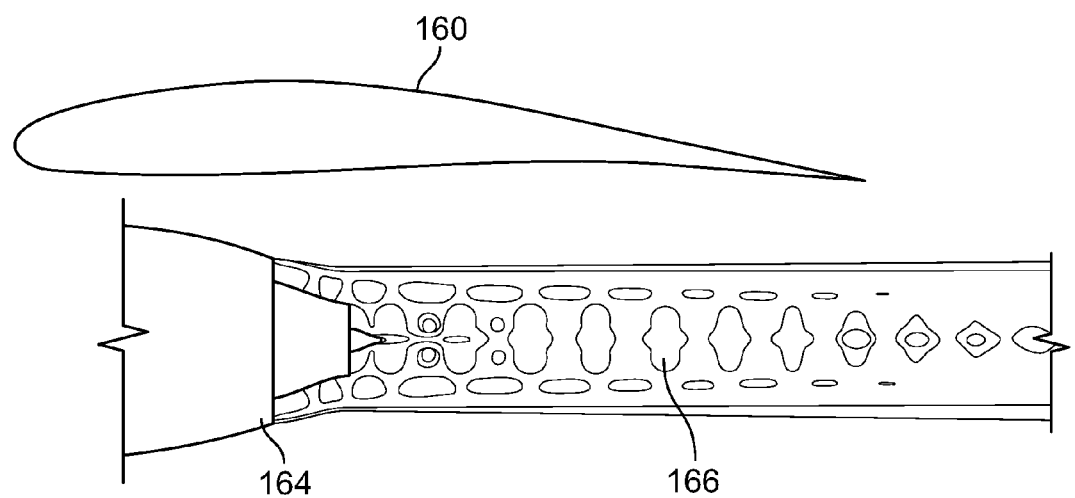

For a conventional commercial aircraft, the method for controlling the exhaust gas air flow passing through an annular or nearly annular exhaust bypass duct of a bypass jet engine includes locating the jet engine beneath an airplane wing 160, as shown in FIG. 18A, such that unvectored jet exhaust flow from a bypass duct 164 is proximate a trailing edge flap 162 of the wing. A predefined portion of a bypass duct is contoured, as disclosed for the example embodiments above, to redirect and vector a portion of the air flow in the bypass duct vectoring the exhaust plume 166 away from the trailing edge flap 162 to reduce the interaction between the jet exhaust and the trailing edge flap. In some embodiments, the contoured portion of the bypass duct is distal to the trailing edge flap. The operating condition shown in FIG. 18A is the unchoked conditions resulting in downward vectoring of the flow while the operating condition in FIG. 18B is choked showing substantially axial flow of the plume 166' in the cruise condition for the wing.

Figure 19:
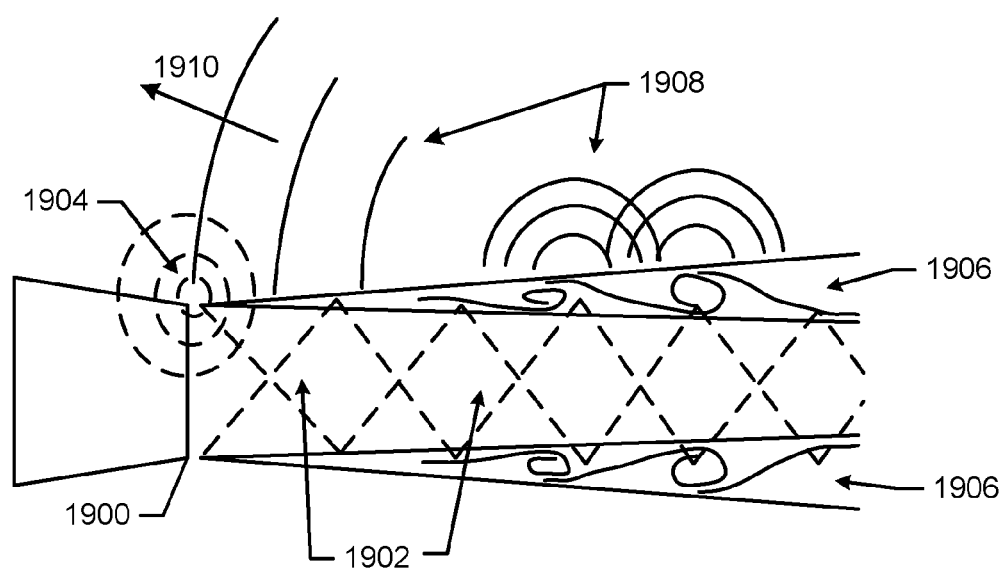

FIG. 19 is a diagram of shock cell noise associated with an imperfectly expanded nozzle, which is represented by a block with reference numeral 1900. In the illustrated example, a structure of shocks cells 1902 forms in the flow when the nozzle 1900 is imperfectly expanded. For example, the nozzle 1900 may be underexpanded or overexpanded. Due to the pressure differentials between the supersonic flow and the subsonic ambient area at an exit 1904 of the nozzle 1900 under the imperfectly expanded nozzle 1900, the shock cells form as pressure equalizes. The resulting structure of the shock cells 1902 may be referred to as a shock cell train. The shock cells 1902 themselves and/or interactions between the shock cells 1902 with disturbances (e.g., vortices and/or turbulence) in shear layers 1906 cause acoustic energy 1908 (e.g., noise) to radiate from the flow. At least a portion of the acoustic energy 1908 radiates upstream in a direction 1910 toward a body of the aircraft (e.g., toward a cabin and/or a fuselage), resulting in undesirable noise in the aircraft.

In conventional nozzles such as the nozzle 1900 of FIG. 19, the nozzle is symmetric around a nozzle axis. Thus, when the nozzle 1900 is imperfectly expanded (e.g., underexpanded or overexpanded), the exhaust annulus is imperfectly expanded uniformly across the exhaust annulus. As a result, the shock cells 1902 and the corresponding shock cell train is uniformly distributed around the exhaust annulus. The uniformity of the shock cells 1902 in conventional nozzles having symmetry around the nozzle axis enables the shock cells 1902 to propagate (e.g., remain intact) through the exhaust for a significant time or distance.

In contrast, the example nozzle geometries disclosed herein (e.g., as disclosed above in connection with FIGS. 1A-1C, 2, 3A, 3B, 4, 6A-6C, 7A-76C, 8A-8C, 9, 10A-10C, 11, 12A-12C, 13, 14, 15A-15C, 16, 17, 18A, and/or 18B) create a nozzle with an asymmetric three dimensional differential curvature and/or con-di area ratio section in a region of the nozzle. The axial asymmetry of the nozzles disclosed herein (e.g., as illustrated in FIGS. 6A-6C, 7A-7C, 8A-8C, and/or 9) causes a first portion of an exhaust annulus to be more fully expanded than a second portion of the exhaust annulus. For example, in addition to equalizing pressure at the throat when in the choked condition, the axial asymmetry of the nozzles disclosed herein reduces pressure downstream from the throat along certain portions of the exhaust annulus. Thus, in the choked condition, the example nozzles disclosed herein create an equalized pressure region in the throat and a non-equalized (e.g., along a circumference of a nozzle exit) pressure region downstream of the throat region. While the equalized pressure at the throat negates any vectoring capability of the nozzle at the choked (e.g., supersonic) condition (as disclosed above), the downstream (e.g., after the throat) pressure differentiation provided by the axial asymmetry of the disclosed nozzles causes certain portions of the nozzle to be more fully expanded relative to other portions of the nozzle. Thus, the pressure differential that causes shock cells is different at different points along the exit of the nozzles disclosed herein. Put another way, the disclosed examples cause certain portions of the nozzles to be more fully expanded than others and, thus, cause certain portions of the shock cells to be different (e.g., have one or more different vectors in terms of magnitude and/or direction). As such, rather than being composed of portions having similar vectors along the exhaust annulus (as in conventional symmetric nozzles), shock cells produced by the axially asymmetric nozzles disclosed herein are composed of portions having dissimilar vectors along the exhaust annulus. Because the different vectors of the different components of an individual shock cell are directed in different directions, the different components of the shock cell (as introduced by the axially asymmetric nozzles disclosed herein) interfere with each other. This interference reduces the uniformity and, thus, strength (e.g., magnitude) of the individual shock cells. Further, the non-uniformity of the shock cells introduced by the axially asymmetric nozzles disclosed herein interrupts a coherence of the corresponding shock cell train, thereby dissipating the shock cell train more rapidly (than a coherent shock cell train composed of uniform and similar shock cells). Accordingly, the disclosed axially asymmetric nozzles mitigate shock cell noise and, thus, the need for additional or alternative shock cell mitigation equipment, structure(s) and/or technique(s).

As described in detail above, embodiments disclosed herein provide a flow vectoring turbofan engine having a fan sleeve outer wall and a fan inner wall or core cowl forming a nozzle incorporating an asymmetric convergent/divergent (con-di) section and/or curvature which varies from a convergent or nearly convergent area ratio and relatively relaxed wall curvature at the top of the nozzle to a relatively greater convergent-divergent area ratio and more concentrated curvature at the bottom of the nozzle. This induces a top-to-bottom pressure gradient resulting in downward vectored flow when the nozzle is operating unchoked (first operating condition) and axially symmetric equal pressure when the nozzle is choked (second operating condition) for substantially axial flow.

In some embodiments, the fan nozzle is for a turbofan engine mounted to an aircraft wing pylon and incorporates a non-constant nacelle station outlet terminating with a plurality of chevrons adjacent to the engine pylon. A differential convergent/divergent and curvature section varies angularly from a midplane and is located in a near exit region of the fan nozzle.

In some embodiments, a fixed geometry differential vectoring nozzle for a gas turbine engine employs a first wall portion having a first curvature and exit and a second wall portion having a curvature and exit varying longitudinally with respect to the first curvature to induce lower pressure near the second wall portion relative to pressure near the first wall portion in a first operating condition and a substantially equal pressure near the first and second wall portions in a second operating condition.

In operation, some embodiments provide a method for exhaust plume vectoring in a turbofan engine which is accomplished without moving parts by providing a nozzle having asymmetric con-di and curvature through the throat and exit of the nozzle in relatively greater amounts along the bottom portion of the nozzle relative to a top portion. The nozzle is operated below a threshold for creating a sonic wave across the entire throat (unchoked) to reduce pressure in the bottom portion of the nozzle having greater con-di and curvature for differentially inducing circumferential momentum resulting in the nozzle flow being vectored toward that portion. The nozzle is operated above the threshold for creating a sonic wave across the entire throat (choked) resulting in substantially uniform pressure across the throat section to produce substantially axial flow.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A jet propulsion device having a flow vectoring duct, the jet propulsion device comprising:
a substantially annular exhaust duct surrounding a jet engine center body forming a pair of concentric opposing inner and outer walls;
a throat region substantially symmetrically positioned in the outer wall of the exhaust duct forming a region of convergence, where the inner and outer walls converge, an amount of convergence varying longitudinally along the inner and outer walls; and
a region of divergence, where the inner and outer walls diverge, an amount of divergence varying longitudinally along the inner and outer walls, an exit vector of an outlet plume at a first bypass engine operating condition is different than the exit vector at a second bypass engine operating condition, wherein the exit vector of the outlet plume transitions at a nozzle pressure ratio of approximately between 1.6 and 1.89, a first transition from the first bypass engine operating condition to the second bypass engine operating condition at which the differential directing of the plume occurs corresponds to a second transition between a low speed operation and a high speed operation.

2. The jet propulsion device as defined in claim 1, wherein the exhaust duct includes a fixed geometry fan sleeve and a core cowl forming a nozzle, the nozzle incorporating asymmetric convergence/divergence (con-di) and wall curvature varying angularly from a midplane for (1) reduced pressure in the first bypass engine operating condition to induce flow turning and (2) axially symmetrically equal pressure in the second bypass engine operating condition.

3. The jet propulsion device as defined in claim 2, wherein the first bypass engine operating condition includes the nozzle pressure ratio being below a threshold allowing unchoked flow through the throat region and an exit of the nozzle.

4. The jet propulsion device as defined in claim 3, wherein the second bypass engine operating condition includes the nozzle pressure ratio being above the threshold creating a sonic wave for choked flow through the throat region.

5. The jet propulsion device as defined in claim 2, wherein the midplane is vertical and a selected portion having maximum con-di is a bottom portion of the nozzle for downward vectoring of flow in the first bypass engine operating condition.

6. The jet propulsion device as defined in claim 5, wherein the core cowl has a symmetrical curvature and an exit of the fan sleeve is not aligned with a constant nacelle station having an exit.

7. The jet propulsion device as defined in claim 5, wherein the core cowl has a symmetrical increased curvature and the fan sleeve has decreased asymmetrical con-di in the fan sleeve.

8. The jet propulsion device as defined in claim 5, wherein the core cowl has an asymmetric increasing curvature with a maximum curvature of the core cowl in the bottom portion of the nozzle.

9. The jet propulsion device as defined in claim 2, further comprising chevrons on an exit circumference of the nozzle.

10. The jet propulsion device as defined in claim 9, wherein the chevrons span a top portion of about 25%-50% of the exit circumference of the nozzle.

11. The jet propulsion device as defined in claim 2, wherein:
the axially symmetrically equal pressure in the second operating condition occurs at a throat of the nozzle; and
the asymmetric con-di and the wall curvature varying angularly from the midplane provide an exhaust annulus downstream of the throat having a first portion more fully expanded than a second portion.

12. The jet propulsion device as defined in claim 11, the first portion of the exhaust annulus being more fully expanded than the second portion to reduce shock cell noise.

13. The jet propulsion device as defined in claim 11, the first portion of the exhaust annulus being more fully expanded than the second portion to dissipate a shock cell train more rapidly relative to the exhaust annulus being symmetrically expanded.

14. The jet propulsion device as defined in claim 1, wherein the exhaust duct includes an outlet region; and
the throat region is located in the outlet region of the exhaust duct.

15. The jet propulsion device as defined in of claim 14, wherein the throat region comprises a section of wall surfaces of the exhaust duct transitioning in a non-uniform manner, the section being located in the outlet region of the exhaust duct.

16. The jet propulsion device as defined in claim 1, wherein a difference between a planar angle of the exit vector at the first bypass engine operating condition and the second bypass engine operating condition is in a range of between 0 to 5 degrees.

17. A jet propulsion device, having a flow vectoring duct, the jet propulsion device comprising:
a substantially annular exhaust duct surrounding a jet engine center body forming a pair of concentric opposing inner and outer walls;
a throat region substantially symmetrically positioned in the outer wall of the exhaust duct forming a region of convergence, where the inner and outer walls converge, an amount of convergence varying longitudinally along the inner and outer walls; and a region of divergence, where the inner and outer walls diverge, an amount of divergence varying longitudinally along the inner and outer walls, an exit vector of an outlet plume at a first bypass engine operating condition is different than the exit vector at a second bypass engine operating condition, wherein a first transition from the first bypass engine operating condition to the second bypass engine operating condition at which differential directing of the plume occurs corresponds to a second transition between unchoked operation of a nozzle of the exhaust duct and choked operation of the nozzle of the exhaust duct.

18. The jet propulsion device as defined in claim 1, wherein the low speed operation comprises at least one of take-off or approach.

19. The jet propulsion device as defined in claim 18, wherein the high speed operation comprises at least one of cruise or climb.

20. The jet propulsion device as defined in claim 1, further comprising an outlet not aligned with a constant nacelle station.

21. The jet propulsion device as defined in claim 1, further comprising an outlet having chevrons.

22. The jet propulsion device as defined in claim 1, wherein the amount of convergence varying longitudinally along the inner and outer walls and the amount of divergence varying longitudinally along the inner and outer walls creates (1) an equalized pressure in the throat region when in a choked condition and (2) an non-equalized pressure region downstream of the throat region when in the choked condition.

23. The jet propulsion device as defined in claim 22, wherein the non-equalized pressure region weakens a shock cell.

24. The propulsion device as defined in claim 1, wherein the exhaust duct includes a fixed geometry differential vectoring nozzle, the nozzle comprising:
a first wall portion having a first curvature and a first exit; and
a second wall portion having a second curvature and a second exit varying longitudinally with respect to the first curvature to induce (1) lower pressure proximate the second wall portion relative to pressure proximate the first wall portion in the first bypass engine operating condition and (2) substantially equal pressure proximate the first and second wall portions in the second bypass engine operating condition.

25. The propulsion device as defined in claim 24, wherein the second curvature of the second wall portion is increased relative to the first wall portion.

26. The propulsion device as defined in claim 24, wherein the second exit of the second wall portion is extended longitudinally beyond the first exit of the first wall portion.

27. The propulsion device as defined in claim 24, wherein the first operating condition is unchoked flow and the second operating condition is choked flow.

28. A method for fan nozzle plume vectoring in a turbofan engine, the method comprising:
providing a fan nozzle having an asymmetric convergence and divergence (con-di) section with greater con-di in a bottom portion of the fan nozzle relative to a top portion;
operating the fan nozzle below a choke threshold to reduce pressure in the bottom portion of the fan nozzle having greater con-di for differentially inducing circumferential flow resulting in the fan nozzle flow being vectored toward the bottom portion; and,
operating the fan nozzle above the choke threshold for substantially uniform pressure across the con-di section to produce substantially axial flow.

29. The method of claim 28, wherein providing the fan nozzle having the asymmetric con-di section comprises:
creating the con-di section with a substantially axially symmetric inner nozzle wall with a curvature and a first exit not aligned with a constant nacelle station outer nozzle wall having a second exit varying angularly about a midplane from minimum divergence at 20° from top midplane to a maximum divergence approaching bottom midplane.

30. The method of claim 28, further comprising providing chevrons adjacent the top portion of the fan nozzle to induce vortical mixing for reducing a velocity gradient across a plume to supplement the vectoring of the nozzle flow.

31. The method of claim 28, further comprising operating the fan nozzle above the choke threshold for a non-uniformly expanded nozzle to weaken shock cell noise.

32. A method comprising:
positioning a jet engine having a bypass duct beneath a wing such that unvectored jet exhaust flow from the bypass duct in a choked condition is proximate a trailing edge flap of the wing; and
contouring a predefined portion of the bypass duct distal to the trailing edge flap to redirect and vector a portion of the air flow in the bypass duct in an unchoked condition away from the trailing edge flap to reduce an interaction between the jet exhaust and the trailing edge flap.

33. A method for vectoring flow in a fixed geometry nozzle comprising:
configuring a nozzle with convergence and divergence and an exit position providing an asymmetrical sectional area ratio from a first portion of the nozzle to a second portion of the nozzle;
operating the nozzle in a choked condition with an exit flow from the nozzle being substantially axial; and operating the nozzle in an unchoked condition for differential vectoring of the exit flow from the first portion of the nozzle toward the second portion.

34. The method of claim 33, further comprising reducing shock cell noise when operating the nozzle in the choked condition by generating an exhaust annulus having (1) a first portion of a first pressure at a region downstream of a throat and (2) a second portion of a second pressure at the region downstream of the throat, the second pressure being less than the first pressure.

* * * * *

UNITED STATES PATENT AND TRADEMARK OFFICE
CERTIFICATE OF CORRECTION

PATENT NO. : 9,732,700 B2  
APPLICATION NO. : 14/496526  
DATED : August 15, 2017  
INVENTOR(S) : Cerra et al.

It is certified that error appears in the above-identified patent and that said Letters Patent is hereby corrected as shown below:

Column 15, Line 8 (Claim 15): remove the word "of" between the words "in" and "claim"

Signed and Sealed this
Tenth Day of October, 2017

Joseph Matal
*Performing the Functions and Duties of the*
*Under Secretary of Commerce for Intellectual Property and*
*Director of the United States Patent and Trademark Office*